(12) United States Patent
Bluemler et al.

(10) Patent No.: US 11,466,235 B2
(45) Date of Patent: Oct. 11, 2022

(54) METHOD FOR A SIMULATION AND EVALUATION SYSTEM FOR MEDICAL TREATMENT FACILITIES

(75) Inventors: Holger Bluemler, Friedrichsdorf (DE); Alexander Schroers, Frankfurt (DE); Yannick Froese, Frankfurt (DE)

(73) Assignee: FRESENIUS MEDICAL CARE DEUTSCHLAND GMBH, Bad Homburg (DE)

(*) Notice: Subject to any disclaimer, the term of this patent is extended or adjusted under 35 U.S.C. 154(b) by 4281 days.

(21) Appl. No.: 16/484,862

(22) PCT Filed: Mar. 27, 2008

(86) PCT No.: PCT/EP2008/053637
§ 371 (c)(1),
(2), (4) Date: Aug. 9, 2019

(87) PCT Pub. No.: WO2008/125451
PCT Pub. Date: Oct. 23, 2008

(65) Prior Publication Data
US 2021/0295741 A1 Sep. 23, 2021

(30) Foreign Application Priority Data
Apr. 16, 2007 (EP) .................................. 07106225

(51) Int. Cl.
G09B 23/28 (2006.01)
C11D 17/00 (2006.01)
C11D 3/48 (2006.01)
G09B 23/30 (2006.01)
G09B 23/32 (2006.01)

(52) U.S. Cl.
CPC ............ *C11D 17/0056* (2013.01); *C11D 3/48* (2013.01); *C11D 17/0095* (2013.01); *G09B 23/303* (2013.01); *G09B 23/32* (2013.01)

(58) Field of Classification Search
CPC ...... G09B 23/28; G09B 23/30; G09B 23/303; G09B 23/32
See application file for complete search history.

(56) References Cited

U.S. PATENT DOCUMENTS 6,969,259 B2 * 11/2005 Pastrick ............... G09B 23/288
434/262
10,648,790 B2 * 5/2020 Foster .................... G09B 23/30
(Continued)

FOREIGN PATENT DOCUMENTS

CA 2923191 5/2016
WO WO 02/03355 1/2002

OTHER PUBLICATIONS

Kunkler et al. The role of medical simulation: an overview. International Journal of Medical Robotics and Computer Assisted Surgery, vol. 2, No. 3, Jan. 1, 2006, pp. 203-210.
(Continued)

*Primary Examiner* — Kurt Fernstrom
(74) *Attorney, Agent, or Firm* — Jacobson Holman PLLC

(57) ABSTRACT

The present invention lies in the field of simulation systems for medical treatments, in particular for treatments carried out on dialysis machines. To do so, a method with which medical treatments can be performed and evaluated without the involvement of real human patients is proposed.

14 Claims, 6 Drawing Sheets

(56) References Cited

U.S. PATENT DOCUMENTS

| | | | | |
|---|---|---|---|---|
| 2007/0166670 A1* | 7/2007 | Sakezles | ............... | G09B 23/30 |
| | | | | 434/86 |
| 2008/0085499 A1* | 4/2008 | Horvath | ............... | G09B 23/285 |
| | | | | 434/262 |
| 2009/0301182 A1* | 12/2009 | Nikanorov | ............. | G09B 23/32 |
| | | | | 73/118.01 |
| 2009/0319009 A1* | 12/2009 | Koch | .................... | G16H 50/20 |
| | | | | 607/96 |
| 2013/0002250 A1* | 1/2013 | Morgan | ............ | G01R 33/4625 |
| | | | | 324/315 |
| 2014/0038153 A1* | 2/2014 | Courtoy | ................ | G09B 23/28 |
| | | | | 434/271 |
| 2014/0099617 A1* | 4/2014 | Tallman, Jr. | ......... | G09B 23/288 |
| | | | | 434/262 |
| 2014/0106333 A1* | 4/2014 | Dugan | ................ | G07C 5/0825 |
| | | | | 434/428 |
| 2014/0322688 A1* | 10/2014 | Park | .................... | G09B 23/303 |
| | | | | 434/268 |
| 2015/0194066 A1* | 7/2015 | Samosky | ............... | G09B 23/28 |
| | | | | 434/262 |
| 2017/0039894 A1* | 2/2017 | Kirchhoff | ............. | G09B 23/30 |
| 2018/0286350 A1* | 10/2018 | Flamand | ............... | G09B 23/32 |
| 2018/0344919 A1* | 12/2018 | Jones | .................... | G16H 50/50 |

OTHER PUBLICATIONS

Anonymous: Patient Simulators Breathe Life into Product Testing, Medical Device & Diagnostic Industry Maganzine, Jun. 1, 1999 URL:http:///www.mddionline.com/article/patient-simulators-breathe-life-product-testing.

* cited by examiner

METHOD FOR A SIMULATION AND EVALUATION SYSTEM FOR MEDICAL TREATMENT FACILITIES

TECHNICAL FIELD

The invention is in the field of simulation systems for medical treatments, in particular for treatments carried out on dialysis machines.

BACKGROUND

For treatment of acute or chronic diseases, special technical medical machines are often used today. Such technical medical machines may carry out various functions. To minimize the risk for patients resulting from faulty operation of such technical medical machines, they are usually operated by qualified medical personnel. The training and qualification of medical personnel are of particular importance. Furthermore, it is within the interest of the manufacturers of technical medical machines to optimize the machines with regard to operability and safety. To prevent risks for the patient, the training of the medical personnel and testing pertaining to the operability and safety of the technical medical machines are advantageously carried out without a real human patient being treated on the technical medical machine. It is a special challenge to be able to conduct the training and evaluation of the qualification of the operating personnel on technical medical machines in a realistic manner, even without the involvement of a real human patient, as well as to obtain relevant information with regard to the operability and safety of technical medical machines.

SUMMARY OF THE INVENTION

Therefore there is a desire to create a possibility for training the medical personnel and improving technical medical facilities with regard to operability and safety.

To meet this desire, the present invention proposes a method [according to claim 1] for simulation of medical treatments comprising the steps of providing at least one technical medical device as part of a simulation environment whose operating parameters can be controlled and can be observed, recording simulation data at least for the duration of the simulation, initiating a change in state of the simulation environment, and verifying a termination criterion.

Preferred specific embodiments are described by the dependent claims.

The present invention is to be explained below on the example of a dialysis machine as an example of one specific embodiment of a technical medical machine.

Dialysis machines are blood treatment machines, in which a fluid from a patient is supplied through a fluid line to a fluid treatment component, treated by the fluid treatment component and then returned back to the patient through the fluid line which can be divided into an arterial branch and a venous branch. Examples of such blood treatment machines include in particular hemodialysis machines. One such blood treatment machine is the subject matter of DE 198 49 787 C1 of the present applicant, the complete contents of which are herewith included in the disclosure content of the present patent application.

Dialysis is a method for purifying the blood of patients in acute or chronic renal failure. A fundamental distinction is made here between methods involving an extracorporeal blood circulation, such as hemodialysis, hemofiltration or hemodiafiltration, and peritoneal dialysis, which does not have an extracorporeal blood circulation.

In hemodialysis, blood is conducted through the blood chamber of a dialyzer in an extracorporeal blood circulation, said blood chamber being separated from a dialysis fluid chamber by a semipermeable membrane. A dialysis fluid containing blood electrolytes in a certain concentration flows through the dialysis fluid chamber. The substance concentration of blood electrolytes in the dialysis fluid corresponds to the concentration of blood electrolytes in the blood of a healthy subject. During the treatment, the patients blood and the dialysis fluid are generally passed in countercurrent at a predetermined flow rate along both sides of the semipermeable membrane. Substances that must be eliminated in urine diffuse through the membrane from the blood chamber into the chamber for dialysis fluid while electrolytes present in the blood and in the dialysis fluid each diffuse from the chamber at a higher concentration to the chamber with a lower concentration. If a pressure gradient is built up on the dialysis membrane from the blood side to the dialysate side, for example, by means of a pump, which withdraws dialysate from the dialysate circulation downstream from the dialysis filter on the dialysate side, then water is transferred from the patient's blood through the dialysis membrane and into the dialysate circulation. This process, which is also referred to as ultrafiltration, results in the desired withdrawal of water from the patient's blood.

In hemofiltration, ultrafiltrate is withdrawn from the patient's blood by applying a transmembrane pressure in the dialyzer, without passing the dialysis fluid over the membrane of the dialyzer on the side opposite the patient's blood. In addition, a sterile and pyrogen-free substitute solution may be added to the patient's blood. We speak of predilution or postdilution, depending on whether this substitute solution is added upstream or downstream from the dialyzer. The mass exchange takes place by convection in hemofiltration.

Hemodiafiltration combines the processes of hemodialysis and hemofiltration. A diffusive mass exchange between the patient's blood and the dialysis fluid takes place through the semipermeable membrane of a dialyzer, and filtration of plasma water contained in the blood also takes place due to a pressure gradient on the membrane of the dialyzer.

The processes of hemodialysis, hemofiltration and hemodiafiltration are usually carried out using automatic hemodialysis machines, such as those distributed by the present applicant, for example.

Plasmapheresis is a blood treatment process, in which the patient's blood is separated into blood plasma and its corpuscular constituents (cells). The separated blood plasma is purified or replaced by a substitution solution, and the purified blood plasma or the substitution solution given back to the patient.

In peritoneal dialysis, a patient's abdominal cavity is filled through a catheter passing through the abdominal wall with a dialysis fluid having a concentration gradient of blood substances such as electrolytes (for example, sodium, calcium and magnesium) with respect to the endogenous fluids. Toxins present in the patient's body come out of the blood vessels running in the peritoneum, passing through the peritoneum, which acts as a membrane, and into the abdominal cavity. After a few hours, the dialysis fluid, which is then mixed with the toxins transferred out of the body and into the patient's abdominal cavity, is replaced. Water can thus be transferred from the patient's blood into the dialysis fluid through the peritoneum by means of osmotic processes, thereby removing water from the patient.

The peritoneal dialysis process is usually carried out with the help of automatic peritoneal dialysis machines, such as those distributed by the present applicant.

Dialysis machines, as an example of complex technical medical machines, have extensive functions. Technical medical machines, such as dialysis machines, are equipped with at least one control unit for controlling these functions. These control units may comprise one or more CPUs (central processing units) or microcontrollers, which are controlled by software programs. In light of the disclosure of the present invention, it does not matter whether the processes described here are carried out by one or more control units. Accordingly, a plurality of control units carrying out the processes described here individually or in association is considered to be a control unit. The software programs are usually stored in an internal memory device. Additional memory devices may be maintained for storing other information, such as treatment data.

Various therapies can be administered with dialysis machines. For the preparation and implementation of a treatment carried out with a dialysis machine, the medical personnel are required to perform extensive activities involving the technical medical machine as well as the patient himself. This necessitates special qualification of the medical personnel, based on the respective dialysis machine, on the one hand, but also pertaining to patient monitoring, on the other hand. This qualification can be acquired and expanded through appropriate training.

Furthermore, it is in the interest of the manufacturer of a dialysis machine to optimize the operability of its machines. The operability of a machine here is understood to refer to the machine-operator interaction in the broadest sense. All actions that must be carried out by the operator on the machine or the structuring of messages directed at the user from the machine fall under the heading of operability. For example, improved operability results in an operator being able to quickly locate a certain touch key on the touchscreen display of a dialysis machine, which he would like to operate, or a certain display, which he would like to see. An improved operability may also be understood to mean, for example, that certain action steps, for example, furnishing dialysis machines with disposable items such as tubing sets or dialysis filters, can be carried out better by the operator.

Regardless of whether the qualification of the medical personnel or the operability of the technical medical machine should be improved or evaluated (or both), it is important that a specific medical treatment is carried out with the specific technical medical machine and observed for this purpose.

To make it possible to obtain the most comprehensive possible statements about the qualifications of medical personnel and the operability of the technical medical machine, it is advantageous here that all situations that can possibly occur during a treatment can in fact be brought about. This also relates in particular to alarm situations, which may have serious health consequences for a patient. It is therefore self-evident that this should not occur with a real human patient.

It is therefore provided that an artificial patient, also known as a dummy patient, should be used.

To improve and/or evaluate the qualifications of the medical personnel and/or the operability of the technical medical machine, the following steps are proposed:

Supplying a technical medical machine whose operating parameters can be controlled and observed externally.
Supplying an artificial patient equipped with essential devices for the treatment to be considered. Such a device is an at least rudimentary vascular system, for example, so that the artificial patient can interact with the technical medical machine for the purpose of carrying out a treatment. The operating parameters of this artificial patient can also be controlled and observed externally to advantage.

Simulation of a technical medical treatment with the technical medical machine on the artificial patient, wherein defined treatment situations can be selected and brought about.

Observing and recording the medical personnel concerned with the treatment and analyzing the recorded data.

In the light of the present invention, "operating parameters" are understood to refer to settings and measured values that can be allocated to the respective device. Thus, the blood pump rate of a dialysis machine is one operating parameter, just as the measured blood pressure or the measured blood temperature in the extracorporeal blood circulation is another operating parameter. In other words, the term "operating parameter" may denote to the condition of each part of a machine or a group of machines, in particular actuators, sensors and control units. The term "extracorporeal blood circulation" is also understood below to refer to means and devices, in particular disposable items, such as tubing, filters, drip chambers, etc., which form an extracorporeal blood circulation, as described above, regardless of whether or with which fluid it is filled. The term "extracorporeal blood circulation" in particular also includes both an unfilled extracorporeal blood circulation and an extracorporeal blood circulation filled with a medical fluid, such as a dialysate, blood or a liquid blood replacement.

BRIEF DESCRIPTION OF THE DRAWINGS

Additional details and aspects of the present machines and methods are described in greater detail below on the basis of the exemplary embodiments illustrated in the drawings.

DETAILED DESCRIPTION OF THE EXEMPLARY EMBODIMENTS

Figure 1:
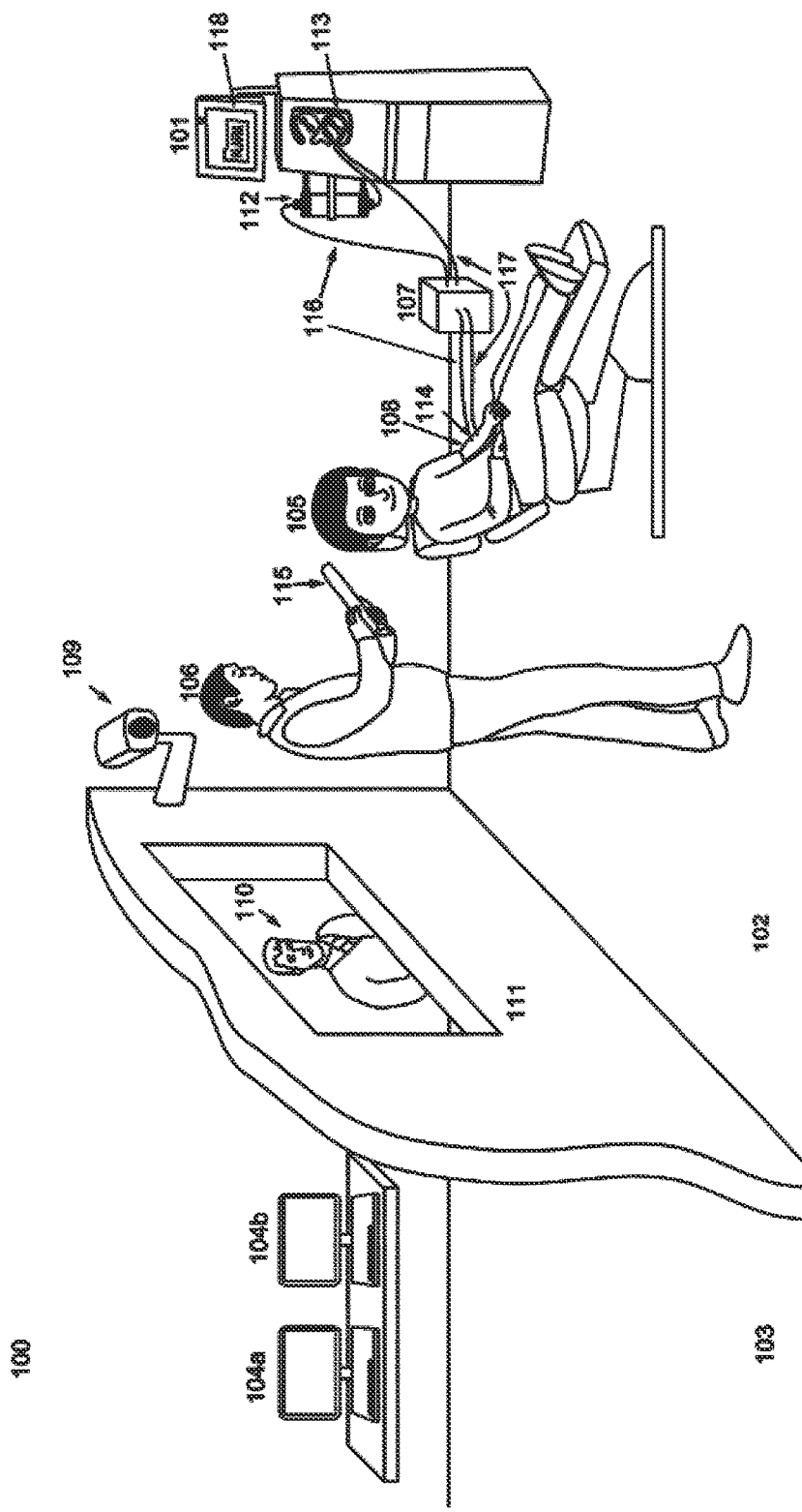
FIG. 1 shows an exemplary overall view of a system according to the invention for simulation of a medical treatment on a technical medical machine embodied as a hemodialysis machine.

FIG. 1 shows an overall view of a system 100 according to the invention for simulation of a medical treatment on a technical medical machine. In the specific embodiment shown in FIG. 1, the system extends over an observation and control room 103 and a simulation room 102. In one specific embodiment, the simulation room 102 contains the devices involved in the simulation, in particular the technical medical machine 101, as well as the artificial patient 105 and, during the simulation, the test subject 106. The simulation room 102 here is part of the simulation environment.

An observer 110 can observe the processes taking place in the simulation room 102 through an opening in the wall from the observation and control room 103. It is possible to provide for the opening 111 to be closed by a semitransparent opaque mirror, which is transparent only in the direction of the simulation room. In the observation and control room 103, various pieces of control and recording equipment 104a and 104b may be present in the room to control the simulation process and record the events. For this purpose, audio and video recording equipment is provided to record the events in the simulation room 102, such as the camera 109 in FIG. 1, for example.

Furthermore, the simulation system includes a technical medical machine 101, which is shown as a hemodialysis machine in FIG. 1 and an artificial patient 105. The artificial patient 105 may have a human shape, as shown in FIG. 1, for example, in the form of a puppet, to replace a real human patient as realistically as possible. In addition, the simulation system may include one or more other devices 107, by means of which it is possible to influence the medical treatment to be simulated.

The medical treatment in the simulation room can be influenced by means of one or more control units 104a,b. The embodiment of the control units is of peripheral importance; under some circumstances, stationary computers, such as those shown in FIG. 1, are possible, as are mobile devices, such as smartphones or tablet PCs. Such a control unit is configured to influence the simulated treatment. To do so, it is programmed accordingly with software and is in data communication with the devices involved in a simulated treatment. Data communication may take place via a hardwired or wireless operation, such as a local area network (LAN), wireless local area network (WLAN), Bluetooth, NFC (near-field communication) or other radio communication technologies or also optical data transmission, for example, by infrared.

The influence on the treatment may be controlled by the process, i.e., the treatment is controlled on the basis of a predetermined programmed sequence. Another possibility is manual control by means of a corresponding operator interface, wherein the observer 110 can intervene in an ongoing treatment at any time and can initiate various medical situations, to which the test subject 106 is supposed to react. For such a manual control, a mobile embodiment of the control unit may be provided so that the observer can carry the control unit with them and thus can remain in spatial proximity to the test subject and/or to the technical medical device.

The influence on treatment may also be random. Therefore, neither the observer 110 nor the test subject 106 is aware of which influence on the treatment will be called upon next by the controller. This rules out the possibility that the simulation is restricted or influenced by personal preferences on the part of the observer.

The test subject 106, who may be, for example, a dialysis nurse or a dialysis physician, can carry a mobile computer 115 with him- or herself, serving as an input/output option for information pertaining to the simulated medical treatment. However, a developer of technical medical machines, for example, may also be considered as a test subject.

The hemodialysis machine, which is shown in simplified form in FIG. 1 comprises an operator interface 118, for example, embodied as a touchscreen display, and at least one pump means 113 with which blood and/or a medical fluid can be pumped in an extracorporeal blood circulation. The extracorporeal blood circulation of the simulation environment includes an arterial blood tube 116 and a venous blood tube 117 as well as a dialysis filter 112. The arterial and venous blood tubes 116 and 117 are connected to the puncture site 114 with a fluid system in the arm 108 of the artificial patient. The fluid system in the arm 108 of the artificial patient comprises additional devices (not shown in FIG. 1), which influence the extracorporeal blood circulation. Means with which both the fluid pressure and the flow in the arterial and/or venous blood tube(s) 116 and 117 can be influenced may thus be provided.

Replacement fluid for human blood, as an embodiment of a medical fluid, is pumped through the dialysis filter 112 by the pump device 113. In one specific embodiment, the replacement fluid flows through one or more additional devices 107, which may have an influence on the extracorporeal blood circulation.

According to the invention, the overall system from FIG. 1 is configured and programmed for carrying out a method for simulation of a medical treatment of a patient on a technical medical device.

Specifically, the method comprises several aspects:

The test subject 106 may be assigned a task in conjunction with the treatment by the medical device. This task may be, for example, to make the technical medical device ready for operation for a certain treatment period. This will usually include the technical medical device with disposable items, such as the dialysis filter, the blood tubing system and the dialysis fluid line (not shown in FIG. 1) on the example of the hemodialysis machine illustrated in FIG. 1. In addition, an operator-machine interaction on the operator interface 118 by means of the operator guidance offered there may be necessary.

The test subject is observed as he manages the task assigned to him. A variety of sensors may be used to monitor the test subject, as referred to below with the general term "personal sensors." This observation may include camera observation (optionally including audio monitoring). In addition, other physiological parameters of the test subject may also be monitored. For example, the test subject's pulse may also be monitored by means of a corresponding sensor (for example, a pulse meter). In addition, the conductivity of the skin, detailed plots of cardiac activity (ECG), brain currents (EEG) and even eye movement may also be monitored. Sensors with which those skilled in the art are familiar may also be used for this purpose, wherein their measured values may be assigned unambiguously to a certain action, for example, by linking the video recording and the values measured by the sensor with unambiguous time values (time stamps).

So-called eye-tracker devices, which evaluate the test subject's eyes by means of video recording and also evaluate the test subject's direction of viewing to ascertain where the test subject's eyes are directed at the moment.

The data obtained by monitoring the test subject can then be analyzed with regard to the qualification and operability as well as safety of the technical medical machine.

Thus, for example, the degree of excitation of the test subject can be determined by means of personal sensors. In this regard, suitable sensors measure, for example, cardiac activity, brainwaves and the conductivity of the test subject's skin. A rapid heartbeat, elevated skin conductivity as a result of excessive perspiration or specific brainwaves may be indicators of an elevated degree of excitation (stress). In conjunction with video recording of the test subject, for example, it is thus possible to conclude that there are certain deficiencies in his/her qualification and/or there is an increased need for training for certain actions forming the basis of the stress situation.

For example, conclusions about the operability of the technical medical machine can be made by recording the viewing direction of the test subject. Hectic eye movements, which fail to be directed at the relevant operating points of the technical medical machine after a short but adequate period of time can permit conclusions about an operating structure of the technical medical machine that requires improvement. For example, if the operator must search on the operator interface for a long time to locate a certain menu point, then this information provides the machine developer with a hint that there is still potential for improvement of the operator's instructions. This is relevant in particular if the test subject is familiar with a previous version of the technical medical machine to be studied and a further development is to be investigated with regard to operability.

However, the statement of object for the test subject may also be to carry out a simulated treatment. Such a treatment would usually follow the procedure described above for furnishing the medical device. It includes actions that are to be carried out on the artificial patient 105 in order to permit an interaction between the artificial patient 105 and the technical medical device, i.e., a hemodialysis machine 101, for example.

In the specific example of FIG. 1, this means that the arterial and venous blood tubes 116 and 117 at the puncture site 114 must be connected to the fluid system in the arm 108 of the artificial patient. The dialysis machine is to be furnished and adjusted in accordance with the treatment to be simulated. In this context, the test subject will, for example, fill up and flush the extracorporeal blood circulation just as in a real treatment. A supply of the blood replacement fluid is kept on hand in a separate container.

In one specific embodiment, one or more external devices 107, which can have an influence on the medical treatment to be simulated, may be in the process of being connected or may already have been connected. In the second case, a fluid line may already be present between the artificial patient 105 and the external device 107, and the test subject establishes a fluid line between the device 107 and the dialysis machine 101 accordingly.

The influence of the external device 107 on the medical treatment to be simulated may include, for example, preventing, stopping or redirecting the fluid flow through the arterial and/or venous line(s). This simulates a partial or complete bending of the corresponding line and/or an interruption in fluid circulation due to a needle slipping out of a puncture site. However, it is also possible to provide for the technical means of the device 107 to be arranged inside the artificial patient. This increases the realism of the simulated treatment.

Figure 2:
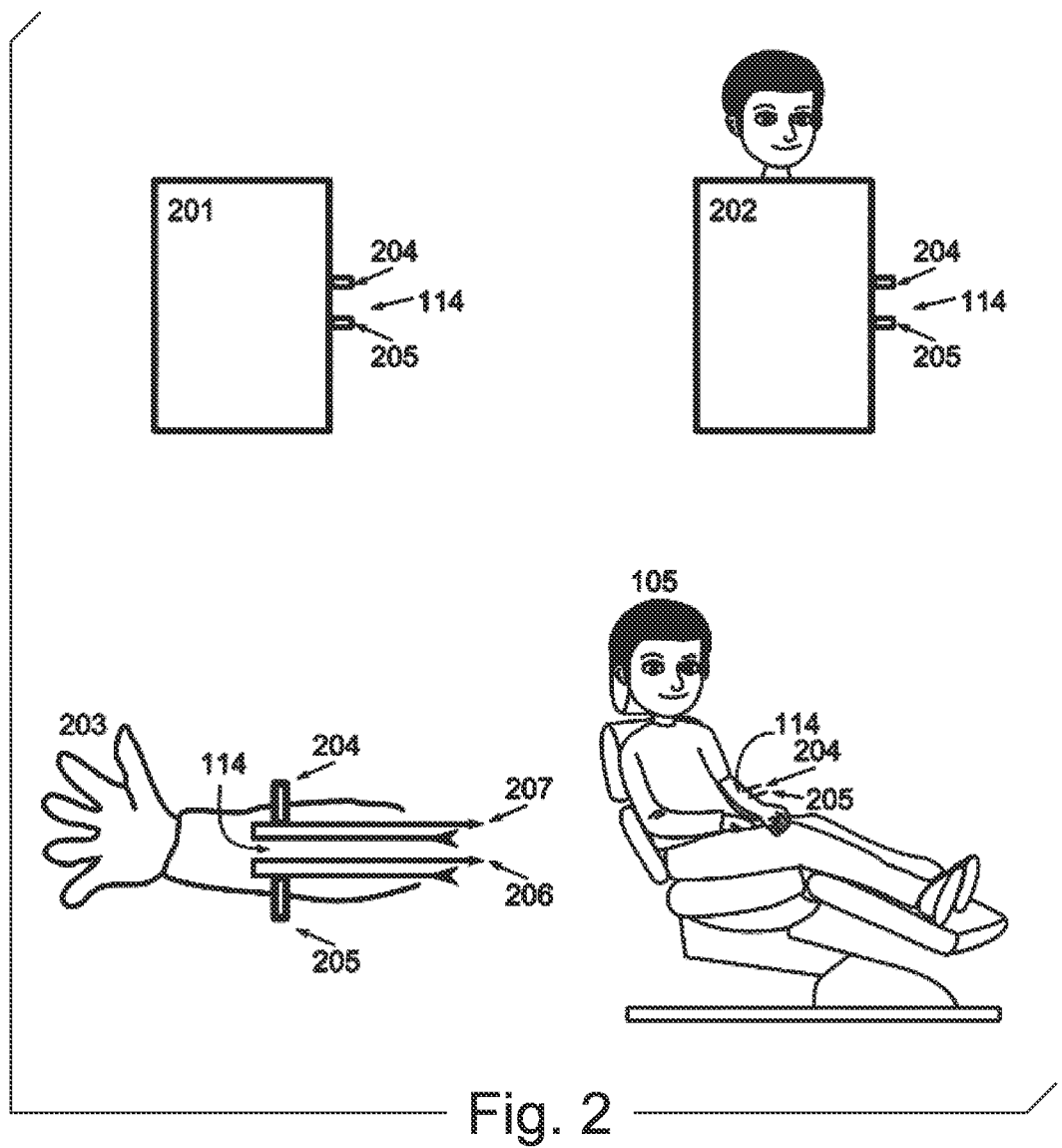
FIG. 2 shows exemplary embodiments of an artificial patient according to the invention.

FIG. 2 shows specific embodiments of the artificial patient wherein the individual specific embodiments differ with regard to the degree of realism of the artificial patient in comparison with a human patient. In its specific embodiments, the artificial patient functions as a device for simulating a wide variety of human properties.

These human properties may include physical properties, such as age, gender, weight, race, height, etc., or the appearance of the eyes (optical image). In addition, the concept of human properties also includes the instantaneous conditions of body parts, organs or body fluids, such as movements executed by parts of the human body, the condition of the human pulse, the viscosity of the fluid in the vascular system, the temperature of the fluid in the vascular system, the respiration status, etc.

Additional human properties also relate to the patient's mental condition, the instantaneous wellbeing or human noises.

In summary, the term "human properties" includes in particular all the properties of a real patient that may be of relevance for treatment of the patient on the technical medical machine.

In the simplest case, there is no similarity between a human patient and an artificial patient. For a system for simulation of a dialysis treatment, which places the focus on the operability of the dialysis machine involved in the simulation, for example, the artificial patient, need not have any similarity to a real person. Thus, for example, the embodiment 201 of the artificial patient has only the puncture site 114 with the fluid lines 204 and 205, which implement the arterial access point (204) and the venous access point (205) to the simulated vascular system of the artificial patient. These fluid lines may have, for example, medical Luer-Lock connectors to which the extracorporeal blood circulation having corresponding counterparts may be connected.

The embodiment 202 of the artificial patient additionally has a simulation of a human head, which may have additional devices to be able to simulate real human behavior and/or responses.

Another embodiment of the artificial patient can be seen as a simulation of a human arm 203. This also has a puncture site 114 and can be equipped with fluid lines 204 and 205 like the embodiment 201. Fluid lines 206 and 207, which simulate a real vascular system in a human being, run in the arm simulation 203. In one embodiment of the arm simulation, fluid can flow through a fluid connection provided for this purpose (for example, 204) into the arm and fluid can run out of the arm through a fluid connection (for example, 205) provided for this purpose. The flows and the pressures in the fluid lines 206 and 207 may be adjustable independently of one another. This is indicated in FIG. 2 by the fact that both the fluid line 206 and the fluid line 207 have an inlet and an outlet. These fluid lines may be subject to influence through independent devices such as pumps, fluid reservoirs, valves (not shown in FIG. 2), etc.

Finally, the embodiment 105 shows an artificial patient which closely resembles a real human patient in its shape.

The purpose of these various embodiments of the artificial patient is to adapt the complexity and furnishings of the artificial patient to the goal of the simulation. Thus by taking into account the cost it is possible to ensure that the artificial patient will have at least the necessary properties for the goals of the simulation. A hypothetically perfect simulation of a real patient would be ideal with regard to realism but it would unnecessarily increase the cost of the simulation task, which does not require this level of realism.

The artificial patient may have the following features:

The artificial patient may be embodied as a puppet with a normal human stature.

With regard to the qualification of the medical personnel for the treatment of special patient groups, the artificial patient may have features of this group in its embodiment. For example, in its stature, the artificial patient may have elderly patients, dementia patients, obese patients or pediatric patients. The external features relate in particular to the stature and appearance of the artificial patient, whereas the overall system may be equipped to simulate the special properties of a patient group. These properties, which are defined in particular by the controller of the artificial patient, relate to the medical, physiological and psychological particulars of the respective patient group. Thus, real behavior of a patient group can be largely simulated by control of the devices of the artificial patient.

Another possibility for simulating real patients with the greatest possible accuracy and increasing the quality of the qualification of medical personnel would be to equip the artificial patient with artificial eyes. This makes it possible to train the medical personnel with respect to visual diagnostics. The background for such an eye simulation is that certain circumstances that may occur in a real treatment can be reflected in a patients visual pattern.

First, one could differentiate between an awake patient and a sleeping patient based on whether or not the eyes are open on the one hand or whether the eyelids are closed on the other hand. In addition, a theatrical rolling of the eyes could be depicted in conjunction with an additional parameter, such as a drop in blood pressure as an indication that the patient is about to faint. The eye presentation may also indicate agitation, anxiety or fatigue.

The head of the artificial patient may be equipped with small monitors for the purpose of the eye simulation, these monitors optionally being placed in the optical cavities. Another possible specific embodiment comprises eyeglasses that can be placed on the artificial patient, wherein the eyeglasses are monitors. The monitors are controlled in such a way that they represent the imaging of human eyes. These images may be animated and/or may comprise video sequences to simulate the changes in representation of the human eyes in the most realistic possible way. In one specific embodiment, the monitors are OLED displays. OLED displays offer a large observation angle, so that the medical personnel can observe the simulated eyes well from any location. In addition the OLED display technology offers the possibility of creating curved monitors to simulate a real Adam's apple as realistically as possible. Another specific embodiment for simulation of eyes provides for projection of the image of the eyes.

Another embodiment of the artificial patient provides that this artificial patient is equipped with a loudspeaker, which can then be used for simulation of verbalizations by a real patient. The artificial patient is thus more or less given a "voice." During the simulation of a medical treatment, human verbalizations and/or noises may be output over the loudspeaker. For example, these may express needs of the simulated patient, such as hunger, thirst or the need to go to the toilet, or they may be an expression of the patient's medical condition, for example, breathing sounds or moaning. The medical personnel must react according to the respective expression and must perform certain actions on the artificial patient accordingly.

In one specific embodiment, a verbal interaction between the artificial patient and the medical personnel can also be evaluated. For example, it may be provided that the medical personnel should provide answers determined in the ideal case or targeted responses to certain verbalizations by the artificial patient. For example, it may be provided that an inquiry as to the patient's wellbeing should be made by the medical personnel in response to moaning or groaning expressed by the artificial patient via a loudspeaker. The verbalizations by the medical personnel can be recorded by means of microphones. In evaluating these verbalizations, it is possible to rely on the technology of speech recognition. In another specific embodiment, however, another person can assess the responses.

In general, the verbalizations made out loud by the artificial patient can be output in a manner that is controlled by the sequence, i.e., the responses are available as saved data and output at certain points in time. However, responses may also be output randomly pertaining to both the type and the time of the response.

However, it is also possible to provide that the verbalizations spoken into a microphone by a real person in the monitoring room, for example, a trainer or a dialysis physician, and output via the loudspeaker on the artificial patient. In this way it is possible to have a flexible response to the overall situation during the simulation.

Verbalizations out loud by the artificial patient can be linked to the control of additional means by the artificial patient. Thus, for example, sounds indicating that the patient does not feel well may be linked to the fact that the means influencing the fluid pressure in the simulated vascular system of the artificial patient are being controlled so as to simulate a decompensated blood pressure.

By means of such verbalizations messages, it is possible to assign a character typical of a certain patient group to the artificial patient, when characteristic verbalizations are played back. Thus, for example, it is possible to simulate a patient with dementia.

Patients with dementia are a growing challenge in the field of dialysis. If the test subject being trained therefore concludes, on the basis of characteristic verbalizations by the artificial patient, that this patient has dementia, then the trainee should pay greater attention to any agitated behavior on the part of the patient, possibly followed by loss of a needle, i.e., the needle and/or the medical connector connecting the extracorporeal blood circulation to the (simulated) vascular system of the artificial patient may slip out. This can be evaluated by monitoring of the trainee, as already described above.

With the knowledge of the special character of the simulated artificial patient, the trainee can also adapt the communication between him and the artificial patient. Thus, the number and type of follow-up questions by the trainee to the artificial patient can be evaluated depending on the configuration, i.e., depending on the patient group to be simulated. Thus, for example, children require a different type of communication than patients with dementia. The statements made by the trainee, directed at the artificial patient, can be recorded and evaluated, and this evaluation can be taken into account in qualification of the trainee.

In general, the verbal verbalizations of the artificial patient may be output in any language. Trainees of any nationality may thus practice with the simulation system. In addition, the foreign language capability of the test subject can optionally also be evaluated and/or trained.

In hemodialysis of acute patients, the vascular system of the patient is usually connected by a neck catheter. It may be provided that there is a corresponding connection to the artificial patient.

The artificial patient may have actuators for simulating a breathing movement. In this way, optionally also in combination with the loudspeaker, it is possible to simulate respiration, in that the actuators are controlled in such a way that the chest, for example, is raised and lowered periodically. Corresponding breathing sounds can make the simulation of respiratory activity even more realistic.

The respiratory simulation can be associated with the assumed emotional state of agitation as well as with the medical situation with the artificial patient. For example, the respiratory simulation can be controlled so as to simulate sleep or anxiety in the artificial patient. This is especially advantageously associated with simulation of the eyes: closed eyes and regular deep breathing indicates sleep, open eyes and shallow irregular breathing indicate anxiety. However, a simulated drop in blood pressure, in combination with a weak simulated respiration is indicative of a cardiovascular problem.

In another specific embodiment, the artificial patient may have actuators for simulation of a pulse. A heartbeat can be simulated by pulsed operation of liquid pumps, for example, which pump the blood replacement fluid in the simulated vascular system of the artificial patient. Suitably controlled flow throttles are also conceivable. In addition, it is possible to provide that a mechanical actuator, for example, a lifting magnet, may generate a perceptible pulse.

In addition, it is possible to provide that an audible heartbeat is generated inside the artificial patient. The pulse generated in this way can be controlled in the manner described here to simulate various medical indications and/or patient states.

In another specific embodiment, it is possible to provide that blood pressure measurements, which the medical personnel can carry out on the arm of the artificial patient, can be influenced. For example, a loudspeaker may be installed in the blood pressure cuff, which determines the result of the measurement. A low blood pressure measured in this way would encourage the trainee to take measures to raise the blood pressure, such as making changes in the ultrafiltration rate, and perhaps to monitor the result of such a measure at shorter intervals. A countermeasure initiated in this way may result in the simulated blood pressure normalizing again. Accordingly, the means for influencing the blood pressure in the vascular system of the artificial patient are controlled and/or the means for influencing the measurement of the blood pressure, i.e., the loudspeaker in a blood pressure cuff here, are controlled accordingly to display a normalization of the blood pressure for the benefit of the medical personnel.

In another specific embodiment, it may be provided that the artificial patient executes real movements. To do so, the artificial patient may be equipped with corresponding actuators, such as electric motors, which move the limbs by means of appropriate mechanisms, for example. Alternatively, the patient's chair can also be controlled. For example, the backrest or leg rest may be moved by a motor. An agitated patient, for example, can be simulated by movement of the patient. Due to the movement of the artificial patient, for example, a real needle loss or a real kink situation with a tubing can be created. The simulated patient movement can also be linked to other devices involving the artificial patient, for example, the means for generating a pulse or the means for generating a sound.

Figure 3:
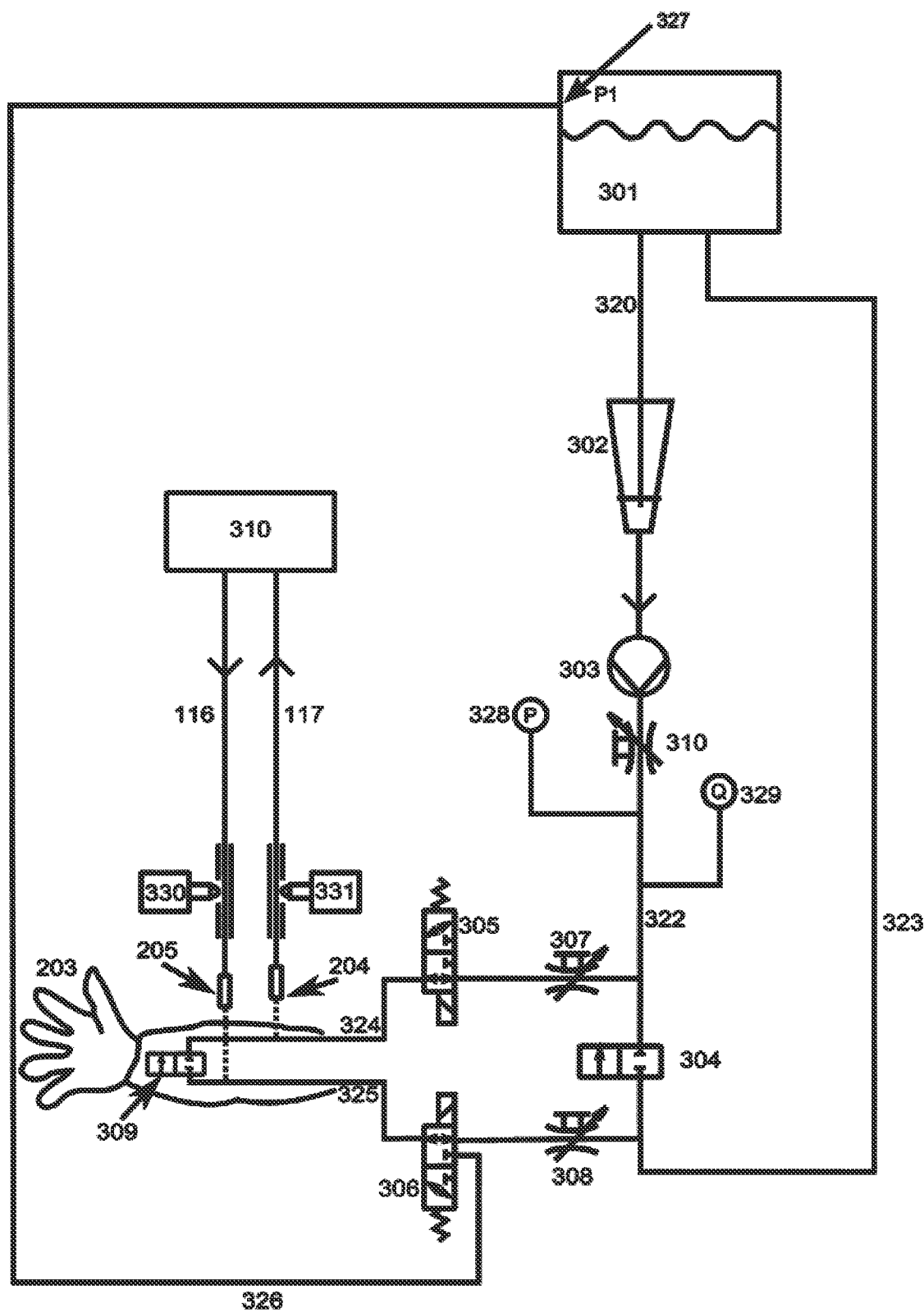
FIG. 3 shows an exemplary embodiment of a fluid system according to the invention for the artificial patient.

FIG. 3 shows in a detailed diagram one embodiment of the simulated vascular system of the artificial patient with parts of the extracorporeal blood circulation.

FIG. 3 shows a first fluid circulation formed from the following elements: reservoir 301, fluid line 320, drip chamber 302, pump 303, throttle valve 310, fluid line 322, valve 304 and fluid line 323 with the valve 304 open.

The throttle valve 310 makes it possible to vary the fluid flow and the fluid pressure, independently of the pump 303.

The fluid lines 324, corresponding to an artery in a real patient, and the fluid line 325, corresponding to a vein in a real patient, run inside the arm of the artificial patient.

The two fluid lines 324 and 325 can be joined by means of the valve 309.

The valve 304 carries fluid during normal operation and is blocked only for filling the overall circulation. During filling, the valve 309 is opened accordingly, so that the fluid lines 324 and 325 are connected to one another. In this configuration, the entire fluid system of the artificial arm 203 can be filled with the blood replacement fluid from the reservoir 301, for example. During normal operation, the valve 309 is closed.

The two fluid lines 324 and 325 are also connected to the first fluid circulation (fluid lines 322 and 323) by way of the 3-way valves 305 and 306 and the proportional valves 307 and 308 (throttle valves). The fluid flow and the fluid pressure inside the fluid lines 324 and 325 can be influenced individually by means of the individually controllable proportional valves 307 and 308.

The 3-way valve 305 can connect the fluid line 324 either to the fluid lines 322 or to the outside air.

The 3-way valve 306 can connect the fluid line 325 either to the fluid line 323 or to the fluid line 326 which leads to the overflow of the reservoir 301.

At the puncture site, the fluid lines 324 and 325 leading outward can be connected to the extracorporeal blood circulation of a dialysis machine 310. This connection may be established by means of medical Luer-lock connectors 204 and 205, for example, which are already shown in FIG. 1, and which can establish a fluid connection to the vascular system of the artificial patient by means of hollow needles (shown with a dotted line in FIG. 3).

A blood pump of the dialysis machine 310 (not shown in FIG. 3) can additionally influence the flows and fluid pressures in the individual fluid connectors.

All the flows and fluid pressures can be monitored by means of corresponding sensors, such as the pressure sensor 328 and flow sensor 329 shown as examples in FIG. 3.

The two squeeze devices 330 and 331 are used to have a targeted influence on the fluid lines 116 and 117 in order to simulate a kink in the blood tubing, for example. Such a squeezing device may have a movable piston which pinches a deformable tube in a fluid-tight manner or prevents flow through this tube. An alternative pinching device is a controllable hose clamp, for example.

The actuators and sensors for the system illustrated in FIG. 3 can be controlled and/or read out. To do so, they have a data connection to at least one control unit (not shown in FIG. 3) which sends control commands to the actuators and can receive sensor data from the sensors.

A variety of medical situations can be simulated by such controlling.

For example, if an arterial needle loss is to be simulated, i.e., slippage of the arterial needle out of the puncture site, then the following steps can be initiated by the control unit.

The 3-way valve 305 is controlled by the control unit in such a way that it connects the fluid line 324 to the outside air, whereupon air penetrates into the circulation due to the intake of the blood pump of the dialysis machine and thus air penetrates into the arterial access. A sensor, which is conventional in general for dialysis machines for determining the fluid pressure upstream from the blood pump, subsequently measures a change in pressure within the access tubing accordingly (fluid line 117 in FIG. 3) because the fluid line 117 is no longer connected to the pump 303 that functions as a pressure source but instead is connected by the 3-way valve 305 to the atmospheric outside pressure.

Dialysis machines are usually equipped with various types of safety devices for monitoring the treatment and for ensuring patient safety. Thus, for example, a sudden measured change in pressure within an access line (117 or 116) may be interpreted by a safety device on the dialysis machine as a needle loss, whereupon the dialysis machine is converted to a secure operating mode, for example, by cutting off the extracorporeal blood circulation, stopping the blood pump and issuing a suitable alarm message to an operator interface.

Another indication of a needle loss, in particular a loss of an arterial needle, may be a drop in the blood level in the venous drip chamber of the dialysis machine (not shown in FIG. 3), which can be detected by corresponding level sensors.

If a venous needle loss is to be simulated, the 3-way valve 306 is controlled by the control unit in such a way that it connects the fluid line 325 to the fluid line 326, whereupon blood replacement fluid from the blood pump of the dialysis machine is pumped into the reservoir 301. In the event of a real venous needle loss, the patient's blood would be pumped out of the machine by the blood pump of the dialysis machine, without any additional measure. In the simulation in the embodiment according to FIG. 3, the blood replacement fluid is prevented from leaking out of the machine, in that the 3-way valve 306 establishes a fluid connection between the fluid lines 325 and 326, so that the blood replacement fluid is pumped into the reservoir 301. The pressure P1 in the reservoir 301 at the overflow 327 corresponds to the outside atmospheric pressure. The reservoir 301 can be equipped with an opening to the outside to ensure this pressure at this location, for example.

A safety device of the dialysis machine thus measures the pressure at the outlet of the overflow in the case of a simulated venous needle loss, which corresponds to a needle in air, and thus controls the subsequent reactions already described, for example, cutting off the extracorporeal blood circulation, stopping the blood pump, issuing a corresponding alarm message on an operator interface.

Another critical situation that may occur during a dialysis treatment relates to the intake on the arterial needle at the vascular wall of the punctured vessel (usually a fistula in chronic dialysis).

In reality, suction of the arterial needle results in a declining blood flow and a strong vacuum in the arterial access line. This can be controlled by corresponding control of the proportional valve 307, for example. The control device of the simulation system controls the proportional valve 307 accordingly to reduce the flow in the fluid line 324. The blood pump of the dialysis machine 301, which is usually embodied as a tube roller pump,//continues to pump at an unchanged pump rate and the flow remains constant due to the design of the model, so the liquid pressure upstream from the pump in the dialysis machine increases due to the increased flow resistance due to the proportional valve 307 there. The safety device of the dialysis machine 301 determines this drop in blood pressure and outputs a corresponding warning message. In a dialysis machine, in which the blood pump is designed as a centrifugal pump, for example, the flow and the liquid pressure downstream from the centrifugal pump also drop because of the design-related character of the centrifugal pump as a constant differential pressure source. The safety device of a dialysis machine 301 embodied in such a way would also ascertain this and would output corresponding messages and/or would initiate actions such as converting the dialysis machine to a safe operating mode.

Another critical situation that may occur during a dialysis treatment relates to a kink in an access line or a return line (116, 117), which is also known as kinking, Such kinking of an access line can be simulated by activation of the squeezing devices 330 and/or 331, for example. Activation of the squeezing device 330 results in an increase in the fluid pressure downstream from the blood pump of the dialysis machine 301. Activation of the squeezing device 331 results in a sudden drop in the fluid pressure upstream from the blood pump of the dialysis machine 301. Both of these changes can be detected by the safety device of the dialysis machine and result in suitable messages and/or actions.

The consequences of kinking of an access line are to some extent identical to the consequences of other errors. For example, suction on the arterial needle will have the same consequences as kinking of the arterial access line 117. In a real treatment situation, the medical personnel can check on whether the access line is kinked. If this state is caused artificially in the simulated treatment, it may happen that the medical personnel cannot visually detect the cause, in particular when the devices used for this purpose (for example, squeezing devices 330, 331) cannot be observed. For example, they may be located in a housing (107), where they cannot be observed, or the activation process is simply not visually discernible due to the design of the devices.

For this case, it may be provided that signal devices, for example, LEDs, which display the operating state of the device, are mounted on such devices for influencing the simulated treatment, whose activation and/or operating status are not otherwise perceptible.

For example, if kinking of the arterial access line 117 is simulated, the squeezing device 331 will be activated and a signaling device assigned to it, for example, an LED will be made to light up.

Likewise, a needle slipping out does not in fact occur, unless it actually occurs during the simulation, but instead the consequences are induced by the corresponding control of devices (control of the 3-way valve 306), can be displayed by a signaling device at the puncture site, for example, a chain of red LEDs symbolizing a trace of blood.

It is also conceivable that not only the consequences of real disturbances are induced in the simulation, but also the disturbance itself is induced. In other words, it may happen that, for example, the needles, which connect the external fluid lines 116 and 117 to the internal fluid lines 324 and 325, which are in the arm of the artificial patient, can be traversed by corresponding actuators. It is thus possible in fact to cause a needle to slip down by means of an actuator, for example, an electrically controllable lifting magnet, which moves the needle out of the patient's arm. Blood replacement fluid leaking out can also be detected in such a case by the moisture detectors, with which those skilled in the art are familiar, and the results can be displayed as an alarm message on the dialysis machine. Such sensors are also used in actual treatment for detection of blood leaking out. Such a moisture detector is described in WO08021462 A2, for example. The functioning of such a moisture detector, for example, is based on the fact that leaking fluid alters the electrical resistance between electrical contacts.

It is conceivable that when using a moisture sensor in the simulation of the treatment, the moisture sensor may be designed in such a way that the resistance between the electrical contacts can be controlled actively, for example, by providing a controllable switch (transistor, relay) which connects the printed circuits, which are originally insulated from one another, so that they are mutually conductive. In this specific embodiment, the sensor may also change its resistance even without the fluid leaking out, which would be interpreted as blood leakage by the safety device of the dialysis machine equipped with this sensor. The realistic aspect can thus be further increased in conjunction with the measures described further above for simulation of a needle loss.

Suction on the needle on a vascular wall can also be induced by moving the needle accordingly, so that it in fact is drawn to an artificial vascular wall.

However, it is also conceivable for the dialysis machine itself to be controlled by the control device of the simulation system for output of warnings. In this case, the dialysis machine is designed so that the simulation system has access to the control of the dialysis machine.

In one specific embodiment, the pump 303 is a centrifugal pump. Centrifugal pumps (also known as impeller pumps) are characterized by a design-related pressure limitation. This has the advantage that a hazardous excess pressure cannot be built up in the fluid system according to FIG. 3, regardless of the position of the individual valves or the flow-through valves.

The fluid system illustrated in FIG. 3 makes it possible to adjust the fluid pressures and flows in the individual branches in the artificial patient arm 203 independently of one another, for example, in that the proportional valves 307 and 308 (throttle valves) are controlled accordingly.

All the actuators (pumps, valves) of the fluid system according to FIG. 3 are embodied in a low-noise version in one specific embodiment, so as not to burden the medical personnel involved with the simulated treatment with any other notices about distractions other than those that would actually occur in reality.

In one specific embodiment, it may happen that the viscosity of the blood replacement fluid can be influenced. To do so, a magneto-rheological and/or electro-rheological fluid may be used as a blood replacement fluid. A magneto-rheological fluid contains magnetically polarizable particles, for example, carbonyl iron powder, which can be polarized by an applied magnetic field and can be reoriented within the fluid in which they are dissolved. In this way, the viscosity of the fluid can be altered in an active manner. However, the viscosity of electro-rheological fluids can be influenced by applying an electric field.

Another possibility for influencing the viscosity of the blood replacement fluid consists of adding substances that influence viscosity, for example, hydroxyethyl starch, abbreviated HES, or polyethylene glycol, abbreviated PEG. These substances may be stored in containers and added to the blood replacement fluid as needed to increase their viscosity. The viscosity can be reduced by adding water, for example.

With the active influence on the viscosity of the blood replacement fluid, an increase in the viscosity of blood can be simulated, for example, by filtering water out through the dialysis membrane (ultrafiltration). Dialysis machines can be equipped with corresponding viscosity sensors, which can detect such a change in the viscosity of the blood replacement fluid.

In another specific embodiment, the temperature of the blood replacement fluid can be adjusted. Heating and cooling devices with which those skilled in the art are familiar can be used to achieve a selectable temperature of the blood replacement fluid. Additional medical situations can also be simulated based on the temperature of the blood replacement fluid, for example, fever or chills in the patient. Dialysis machines are often equipped with sensors for detecting the temperature in the extracorporeal blood circulation. Thus, with a deviation in the blood temperature from an expected value, an alarm message can be output to which the test subject must react, for example, with manual determination of the patient's body temperature and taking countermeasures.

Figure 4:
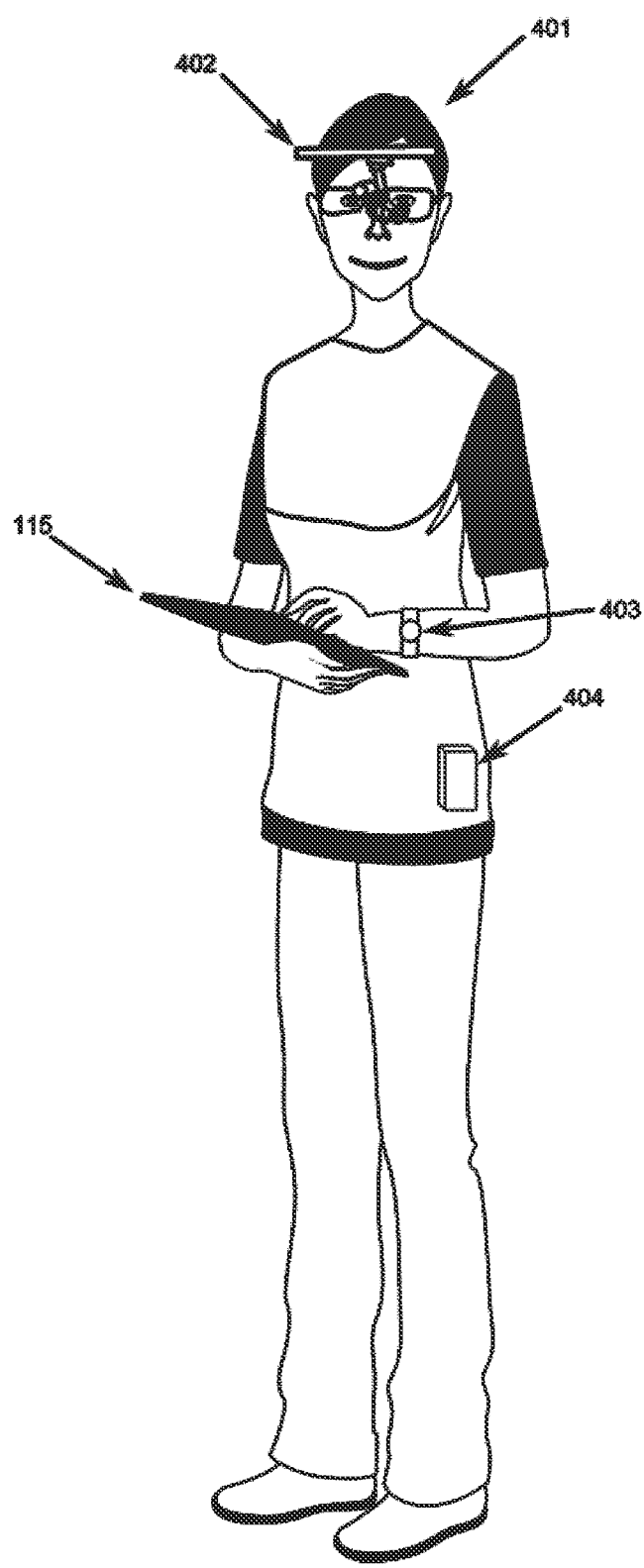
FIG. 4 shows a diagram of a test subject having a plurality of exemplary personal sensors according to the invention.

FIG. 4 shows a test subject 401 being trained on the simulation system 100 (resembling the test subject 106 in FIG. 1) having a plurality of monitoring devices 402, 403, 404, which serve to monitor the behavior and physiological parameters of the person 401 being trained.

Thus by means of so-called eye-tracking glasses 402 it is possible to detect the spot where the test subject is looking. Therefore, the eyeglasses 402 are equipped with cameras, which are aimed at the eyes of the test subject, on the one hand, and in the direction of viewing, on the other hand. By means of a special evaluation logic system, it is possible to calculate from the two-camera image which spot the test subject 401 is looking at. Those skilled in the art are familiar with eye-tracking devices, for example, from WO2004066097A2.

Thus, inferences about the training status of the test subject can be obtained by monitoring the direction of viewing as well as the respective points to which the test subject's 401 view is focused (focusing points). Thus, for example, the speed with which certain operating points on the dialysis machine are observed, for example, in response to certain simulated medical events, may be a measure of how familiar the test subject is with the dialysis machine used in the simulation. It is also possible to evaluate how reliably and how quickly the test subject performs the necessary actions on the artificial patient. An action on the artificial patient may be necessary in response to simulated medical events. For example, a needle loss may be simulated in the manner described above, in which case the test subject is evaluated for how quickly and in a targeted manner his line of sight is directed at the potential error source, i.e., the puncture site in this case, without having to search for it for a long time.

However, monitoring the direction of viewing of the test subject 401 can also serve to provide information about the operability of a medical device. Thus, for example, one can assess whether a certain operating concept leads to a rapid and safe operation by analyzing the directions of viewing during operation. Such an assessment, for example, as part of a risk analysis, may also pertain to medical procedures, for example, certain procedures for equipping the medical device or in dealing with the patient.

In general, the monitoring of physiological parameters of test subject 401 serves to assess their physical and mental stress. All the sensors that detect parameters relevant for this can be used for this purpose. FIG. 4 shows as an example a device 403 for measuring blood pressure, pulse, skin moisture and/or skin resistance, etc., which can be used as indicators of the physical and mental stress. In FIG. 4 the device 403 is in the shape of an armband, for example.

The device 404 symbolizes a device for detecting physiological parameters, for example, body temperature, EKG, EEG, respiratory rate, etc. The implementations required for this are familiar to skilled persons from the prior art. The physiological parameters thereby detected correlate with the simulated treatment and are evaluated by experts to be able to draw conclusions about the test subject and/or the simulation environment (operability, medical procedures). The physiological parameters detected can be combined with audio and video recordings, which are then included in the evaluation accordingly.

Due to the evaluation of the training status of the test subject, which has thus been conducted, it is possible to objectively measure and certify the qualification level of the test subject. In this way, simulations can be carried out with tasks in various degrees of difficulty, which the test subject should be able to manage. The requirements of medical assistance personnel are usually lower than the requirements of regular medical personnel, and a differentiation can also be made here, for example, between "qualified for consulting in normal treatments" and "qualified for consulting in acute treatments," or "qualified for consulting in intensive care treatments." The tasks assigned in the simulation may vary according to the degree of qualification. In other words, the medical and/or technical situations in the treatment simulation differ depending on the degree of qualification to be certified from "simple" for medical auxiliary personnel to "normal" for regular medical personnel all the way to "difficult" for medical personnel in intensive care wards or physicians, for example.

Repeating such qualification certifications provides a guarantee that the medical personnel will constantly receive advance training, thereby ensuring the quality and safety of the treatment accordingly.

Any parameters recorded during the simulation may be used for the certification. For example, the number of tasks solved correctly during a treatment simulation may be based on the time required to do so. Alternatively, the measured physiological parameters of the test subject may influence such a certification.

The test subject 401 may use a mobile computer 115 (tablet PC or smartphone). The mobile computer 115 may have software loaded onto it, which it can run to support the simulation in various ways. Thus, to evaluate the learning effect on the mobile computer 115 in a simulated medical situation, for example, an alarm situation, the test subject 401 may be shown a possible choice among possible causes for the medical situation that has occurred. The test subject may select one cause from the options that seems correct. The choice may be documented and evaluated, in which case the evaluation includes whether the choice was correct and how quickly the test subject made the choice. These factors may also be taken into account in the certification of the test subject.

In addition, it is possible for the mobile computer 115 to offer online help. For example, online help may be offered if the test subject is having difficulty in responding properly to a simulated medical situation, offering concrete background information on the medical situation that has occurred. Such online help may have access to external databases.

In addition it is possible to provide that the test subject communicates directly with an expert via the mobile computer 115. To do so, an audio and/or video transmission, which takes place between the test subject and experts, may be provided. It is thus possible for an expert to communicate directly with the test subject, to answer questions, provide suggestions or instructions.

The mobile computer 115 is therefore programmed with corresponding software which can interact with the control software of the remaining simulation environment. To do so, technical data links between the mobile computer 115 and the control and recording devices 104a and 104b as well as two other networks, for example, the Internet, may be provided. These technical data links are advantageously wireless. The camera, microphone and loudspeaker of the mobile computer, which are often present as standard equipment, may be used for communication between test subject and experts.

In one specific embodiment, the procedures carried out as described by the mobile computer are also carried out by the medical device. To do so, an operator interface of the medical device implemented as a touchscreen display may also be used as an input/output device as in the embodiment with the mobile computer. It is also conceivable for the medical device to be equipped with a camera, a microphone and a loudspeaker by means of which the test subject can communicate with experts in the manner already described. The medical device is thus equipped in this specific embodiment to establish and audiovisual communication with a remote device. The technical medical device is therefore programmed with corresponding software which can interact with the control software of the remaining simulation environment.

Figure 5:
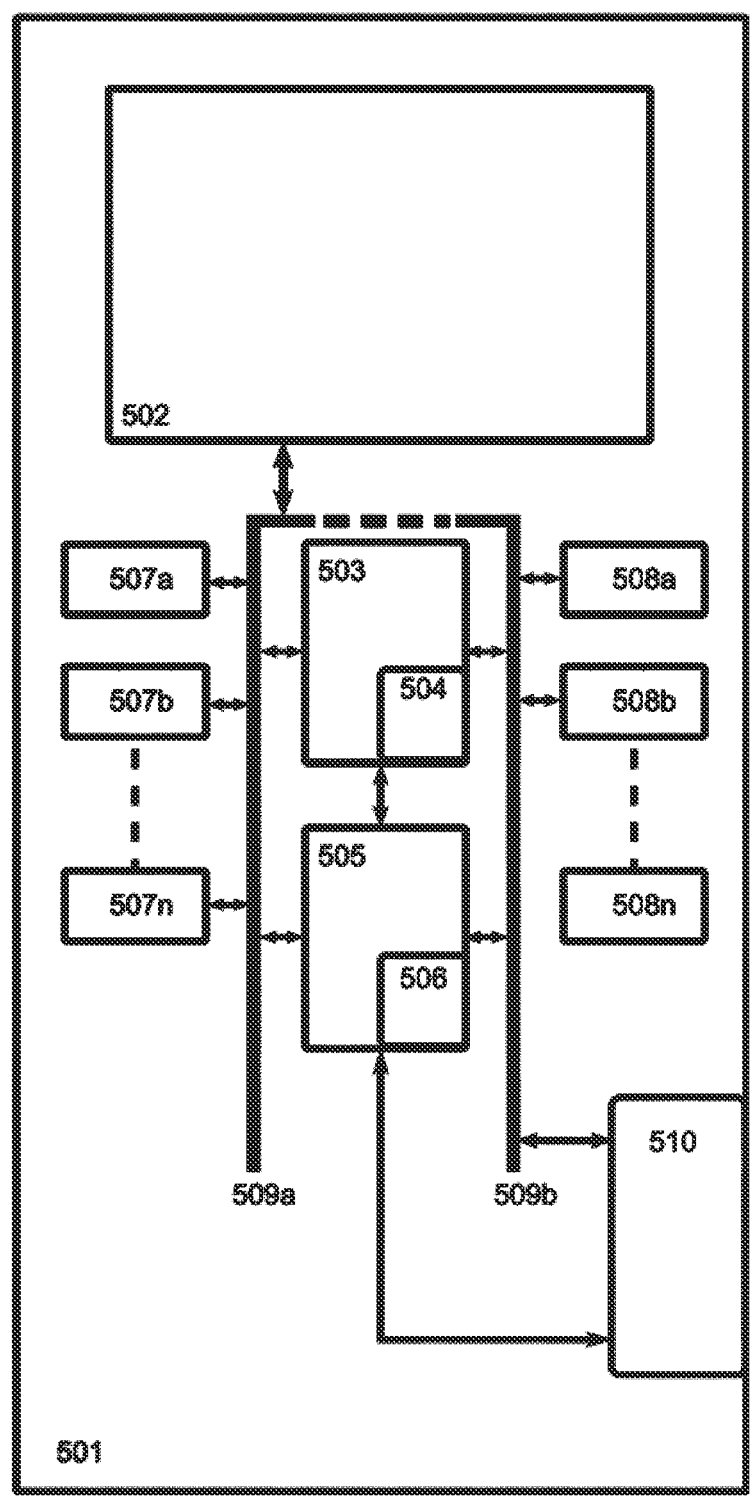
FIG. 5 shows in a schematic diagram an exemplary embodiment of a technical medical machine according to the invention.

In a schematic diagram, FIG. 5 shows a technical medical device 501 (like the technical medical device 101 from FIG. 1 which was embodied as a hemodialysis machine) with essential components.

The technical medical device 501 is usually equipped with an operator interface 502 which is advantageously embodied as a touchscreen display, i.e., a display screen with a touch-sensitive surface for receiving operator inputs.

Technical medical devices are usually controlled by one or more control units, which can advantageously be programmed with software. In the light of the disclosure of the present invention, a plurality of control units is also always included by naming one control unit (single number). The software required to do so may be stored in a data memory, which can also be used for data storage of other data.

FIG. 5 shows the technical medical device 501 as an example with two control units 503 and 505, each with separate data memories 504 and 506. The control unit 503 here may serve as a central control unit for controlling operation of the technical medical device, while control unit 505 can act as a safety and monitoring control unit independently of the status of control unit 503.

In addition, the technical medical device 501 may also be equipped with at least one actuator 507a to 507n and at least one sensor 508a to 508n. Actuators include in particular electromechanical transducers, such as pumps, valves, motors, actuators, loudspeakers, etc., but also heat or cold generators or hydraulic or pneumatic elements. Actuators and sensors work together to carry out the treatment that is possible with the technical medical device 501 and are thereby controlled and monitored by the control units 503 and/or 503 and 505.

To do so the actuators 507a to 507n and the sensors 508a to 508n may be connected by technical data links to the control unit 503 and/or to the control units 503 and 505. FIG. 5 illustrates a data exchange between two components symbolically by a double arrow. For the data exchange, the technical medical device 501 in FIG. 5 has as an example at least one databus 509a and 509b. The dotted line in FIG. 5 connecting the databus 509a and 509b indicates the specific embodiment having only one databus. The databuses 509a and 509b may also be present separately and independently of one another. The databuses may be designed according to the CAN industrial standard in particular.

The technical medical device 501 has a data interface 510 for data exchange with external devices or networks. This data interface may have any design, for example, as a cable connection or wireless. The data transmission may also take place according to any desired data transmission protocol, in particular conventional Internet protocols such as transmission control protocol/Internet protocol (TCP/IP). However, proprietary data transmission protocols may also be used.

It is possible to have an influence on the control unit of the technical medical device 501 by means of the data interface. Thus, for example, the technical medical device 501 may be configured for the purpose of use in the simulation system on which the invention is based such that additional control units, for example, the control and recording devices 104a and 104b can cooperate with the control unit of the technical medical device over the data interface in order to control the technical medical device according to the medical treatment to be simulated. To simulate a specific medical situation, the technical medical device 501 may either be brought into the corresponding state by controlling actuators or on the other hand sensor values, i.e., the output parameters of the sensors 508*a* through 508*n* may be altered and/or manipulated by the external control and recording device (104*a*, 104*b*), such that certain values, which do not correspond to the real values but are characteristics of certain alarm conditions, for example, are transmitted to the control unit (503, 505) of the technical medical device. The control unit of the technical medical device defines an alarm situation as a result of these manipulated sensor values in accordance with its programming and outputs a corresponding alarm message preferably on the operator interface 502. A test subject participating in this simulation system may respond to the alarm message thereby displayed.

For example, in the case of a technical medical device embodied as a hemodialysis machine, with which a dialysis treatment is to be simulated, the sensor value of the venous pressure sensor, i.e., the sensor that measures the blood pressure in the venous blood tube could be manipulated, so that the control unit of the hemodialysis machine concludes that the venous needle has been lost, which is a potentially health-threatening situation for a patient connected to the machine. As a result of this manipulated sensor value, the dialysis machine can interrupt the treatment and switch to a safe operating state (for example, stopping the blood pump, clamping off the patient blood tubes). An alarm message corresponding to the manipulated sensor value, for example, "venous pressure alarm," can be output by the hemodialysis machine.

It is possible to provide that the external control and recording device (104*a*, 104*b*) also at the same time activates a signaling device at the puncture site of the artificial patient 105, for example, a chain of red LEDs symbolizing a blood tracing.

It is possible to provide that the cause for the alarm message diagnosed by the test subject participating in the simulation is input into the mobile computer 115 which is in turn connected by a data link to the external control and recording device (104*a*, 104*b*) and thereby can transmit the input by the test subject. Instead of the mobile computer 115, the technical medical device 501 may also be programmed in the manner already described to fulfill the same functions as the mobile computer 115.

The external control and recording device may be programmed so that the input by the test subject is verified. Depending on the input by the test subject into the mobile computer 115 (or the technical medical device 501) and/or depending on actions taken on the hemodialysis machine, which can also be reported via a data link from the hemodialysis machine to the external control and recording device, additional control commands may be sent to the hemodialysis machine, the artificial patient 105 (and associated devices) and/or to the mobile computer 115.

Thus, input of the correct cause for an alarm that has been displayed may cause the external control unit to again transmit the actual arterial pressure value to the internal control device of the hemodialysis machine. The test subject must usually also confirm on the operator interface of the hemodialysis machine that the cause of the alarm has been eliminated, whereupon it can continue with the treatment.

It is also possible to provide that the technical medical machine 501 has additional devices, in particular actuators, to influence the technical medical device in a targeted manner. For example, in the case of a technical medical device embodied as a hemodialysis machine, the blood tubing is actually closed by a controllable clamp (electro-mechanically, pneumatically or hydraulically) to simulate kinking, i.e., the squeezing of a tube, or air may be introduced into the extracorporeal blood circulation by an additional pump in order to simulate leaky condition.

The technical medical device involved in the simulation system may be designed so that certain operating states such as alarm conditions, for example, can be actually induced or only the control of the technical medical device is manipulated in such a way that it closes in response to an alarm condition, although the alarm is not really occurring.

Regardless of the embodiment of the technical medical device, it may be designed so that the external control and recording device (104*a*, 104*b*) has access to the fundamental benefits thereof. This may comprise a purely software-based embodiment, but additional hardware may also be necessary to allow manipulation of the data traffic between the internal control unit (503, 505) of the technical medical device (501) and the actuators (507*a-n*) and sensors (508*a-n*).

A few operating states of a technical medical machine embodied as a hemodialysis machine, these states being inducible by the external control and recording device (104*a*, 104*b*) are described below.

It is possible by means of access to any variables in the software of the hemodialysis machine to manipulate the output variables of any sensors of the machine in such a way that false values are relayed, so that subsequently all possible alarms can be generated. Such alarms may pertain to pressure alarms in the extracorporeal blood circulation and in the dialysis circulation. Other possible alarms include blood leakage alarms, for example, when there is leak in the extracorporeal blood circulation or when there has been a rupture of the dialyzer membrane, in which blood leaks out of the blood circulation and into the dialysate circulation and can be detected there by a blood leakage sensor. In addition, admission of air to the extracorporeal blood circulation can control corresponding alarms. All the actuators, for example, the blood pump, can also be manipulated in order to induce a failure of the actuator, for example. It is also possible to simulate a complete failure of the power supply, for example, by controlling a relay, which separates the hemodialysis machine from the power supply.

Leakage results in the extracorporeal blood circulation can also be simulated by fluid in a collection bag, which is kept on reserve for collecting fluid leaks in some hemodialysis machines. However, the leakage fluid can also be collected first in a collecting channel and then sent to a moisture sensor. To collect fluid, a dedicated pump may be provided, but it is also possible to provide a valve that diverts fluid out of the extracorporeal blood circulation in a targeted manner.

For example, to simulate a leak in a blood tube, such a moisture sensor that is kept on hand for detecting leaks of fluid can be manipulated. However, actual fluid may also be guided to the moisture sensor by means of an additional pump or a branching wall. It is possible to provide that the test subject must remove the fluid before the treatment can be continued, which mostly corresponds to an actual treatment.

Possible mistakes made in a treatment that can be simulated in the manner described here include, for example, a hose clamp that was inadvertently not opened or the simulation of a dialyzer that is clogged by blood clots (clotting), the latter of which is recognizable by the transmembrane pressure, i.e., the difference in the (average) fluid pressure on the blood side and that on the dialysate side of the dialyzer membrane.

In simulation of various occurrences, it is possible to consider how the simulation should be run. It is thus advantageous to simulate air in the extracorporeal blood circulation in real terms with real air, i.e., for example, by pumping air through a corresponding pump into the extracorporeal blood circulation. If the air alarm is simulated only by the manipulation of internal device variables, then there is the possibility that a test subject might interpret the air alarm as a false alarm because there is no air in the extracorporeal blood circulation.

The operating states to be induced by the additional control units such as the control and recording devices 104a and 104b correspond logically to abnormal operating states because they induce or simulate errors or alarm states.

Figure 6:
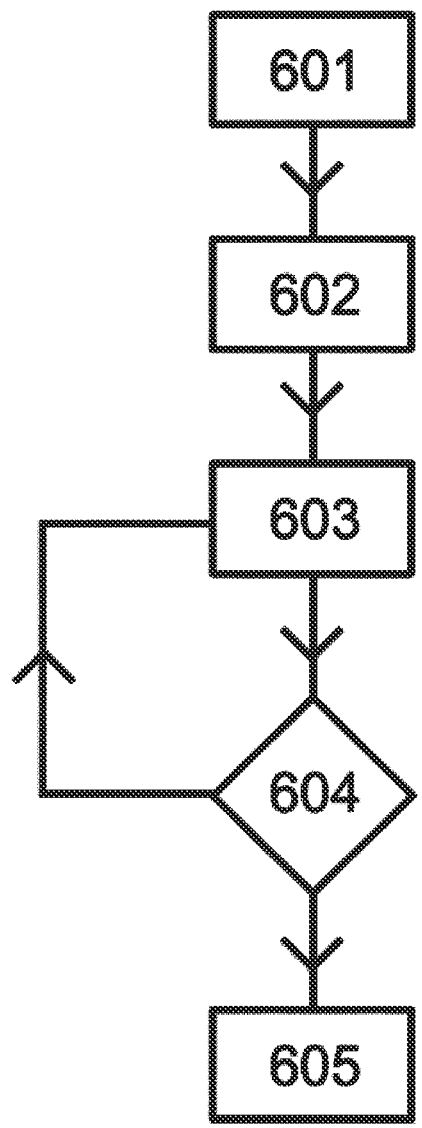
FIG. 6 shows an exemplary schematic flowchart for a method according to the invention.

FIG. 6 shows a schematic flowchart for a method consistent with the teaching to the present invention.

This method starts in step 601. In step 602, recording of the simulation is initiated. This recording may comprise recording all possible parameters of the training subject, for example, by means of the monitoring devices 402, 403, 404 in FIG. 4 which serve to monitor the behavior and physiological parameters of the trainee 401. In addition, the recording of the simulation may also comprise audio and video recordings (for example, using the camera 109 in FIG. 1). In addition, the recording of the simulation may also comprise recording of operating parameters of the devices involved, in particular the devices (technical medical) participating in the simulation and the devices involving the artificial patient. The operating parameters of a device characterize the current status of the device in the broadest sense. These may be parameters of state of actuators and sensors of the device, variable values of the software control, current and voltage curves of the electric power supply, etc., and are linked to a definite point in time.

In addition, the recording may also include the fact that all inputs made by the test subject into the mobile computer 115 or a suitably programmed technical medical device and also the outputs, in particular the dialysis output of the mobile computer 115 or of the technical medical device are stored.

The recording of the simulation in step 602 takes place through corresponding devices such as the control and recording devices 104a and 104b in FIG. 1, which may be embodied as a computer. The data generated may be stored locally in the control and recording devices 104a and 104b and/or in a remote memory medium, for example, in a server connected by a data network or in a data cloud.

The purpose of recording the simulation is to link the actions and the status of the test subject during the simulation to the sequences and states of the devices involved in the simulation and the artificial patient participating in the simulation in order to thereby be able to derive findings regarding the level of qualification of the test subject and/or the operability of the devices participating in the simulation.

In one specific embodiment, the recording is made at least until the end of the method in step 605.

In step 603, a change in state of the simulation environment is initiated. A change in state of the simulation environment serves to simulate a certain scenario which may occur in a real treatment. To this end, all the devices participating in the simulation, in particular the technical medical device and the artificial patient may be controlled in the manner already described such that they assume a certain state. It is also conceivable for the environmental variables in the simulation room 102 to be influenced, for example, the lighting, the temperature of the ventilation or the atmospheric humidity in the simulation room 102 may be varied and/or noises may be played back via loudspeaker.

In step 604, a termination criterion of the simulation is checked. Such a termination criterion may be an operator input by the observer 110, for example, who thereby terminates the process. Other termination criteria may include a timer that has expired so that a fixed simulation time is achieved, or the occurrence of a harmful situation during the simulation, necessitating immediate termination of the simulation.

If the termination criterion occurs then step 605 takes place, namely the termination of the simulation. If the termination criterion does not occur, then the step 603 is carried out again.

The end of the simulation may include the fact that the devices involved in the simulation are placed in a safe state.

In conclusion it should be pointed out that the description of the invention and the exemplary embodiments are fundamentally not to be understood as restrictive with regard to a certain physical implementation of the invention. All the features explained and presented in conjunction with individual specific embodiments of the invention may be provided in various combinations in the subject matter according to the invention or the method according to the invention in order to implement their advantageous effects simultaneously. For example, it is thus also within the scope of the invention to also, alternatively or cumulatively, integrate other devices which have an influence on the simulated medical treatment, for example, into the simulation environment or to integrate the devices, which are described in specific exemplary embodiments as separate individual devices into a higher-level device in addition to the devices involved in the simulation. Thus, for example, the control and recording devices 104a,b may also be present in one specific embodiment as an integral component of a technical medical device involved in simulation of a medical treatment.

For a skilled person, it is obvious in particular that the invention may be used not only for dialysis machines and treatments carried out with them but also with any other technical medical devices and medical treatments that can be carried out with them.

The scope of protection of the present invention is defined by the claims and is not restricted by the features illustrated in the figures or explained in the description.

The present invention relates in particular to the following aspects:

A1. Method for simulation of medical treatments, comprising the steps:

supplying at least one technical medical device as part of a simulation environment, whose operating parameters can be controlled and observed;

recording simulation data at least for the duration of the simulation, initiating a change in state of the simulation environment, checking a termination criterion.

A2. Method according to aspect A1 with the additional step:

providing an artificial patient as part of the simulation environment, wherein the artificial patient can interact with the technical medical device for the purpose of carrying out a simulated treatment and whose operating parameters can be controlled and observed.

A3. Method according to aspect A2, according to which the simulation data include operating parameters of the artificial patient.

A4. Method according to any one of the preceding aspects, according to which the simulation data may be selected from the following group:
- physiological data on a test subject;
- focusing points of a test subject;
- audio and/or video recordings of a test subject;
- input of a test subject into an operator interface;
- operating parameters of the technical medical device.

A5. Method according to any one of the preceding aspects, according to which the initiation of the change in state of the simulation environment comprises:
controlling the medical technical device and/or a device that interacts with the technical medical device such that the medical technical device and/or the device interacting with the medical-technical device converts its instantaneous operating state into another operating state.

A6. Method according to aspect A2, wherein the initiation of the change in state of the simulation environment comprises:
controlling the artificial patient in such a way that the artificial patient converts its instantaneous operating state into another operating state.

A7. Method according to any one of the preceding aspects, wherein the initiation of the change in state of the simulation environment comprises:
changing the environmental variables in a simulation room where the environmental variables of the simulation room are selected from the group:
- room temperature;
- illumination intensity;
- noise level;
- ventilation;
- atmospheric humidity.

A8. Method according to any one of the preceding aspects, wherein the initiation of the change in state of the simulation environment is characteristic of a certain medical situation.

A9. Method according to any one of aspects A2 to A8, wherein the artificial patient has a human shape and is equipped with at least one of the following devices:
- artificial eyes which can be controlled in such a way that their visual appearance can be varied;
- a loudspeaker;
- at least one actuator that is equipped for moving at least one part of the artificial patient;
- at least one actuator that is arranged in the artificial patient and configured in such a way that a perceptible pulse is generated by controlling the actuator.

A10. Method according to aspect A9, wherein the controlling can be selected from the following group:
- controlling the artificial eyes in such a way that their appearance corresponds to a selectable state of the artificial patient;
- controlling the loudspeaker in such a way that human sounds are output via corresponding to a selectable state of the artificial patient;
- controlling the at least one actuator, which is equipped for moving the at least one part of the artificial patient such that a selectable movement of the artificial patient takes place;
- controlling the at least one actuator, which is arranged and configured in the artificial patient in such a way that a perceptible pulse is generated by controlling the actuator, such that the pulse thereby generated corresponds to a selectable state of the artificial patient.

A11. Method according to aspects A2 to A10, wherein the artificial patient is equipped with a fluid system, which has at least one fluid line, which can be connected to an external fluid system, and wherein the fluid system of the artificial patient is designed so that the flow and the fluid pressure in the at least one fluid line can be influenced independently of one another.

A12. Method according to aspects A11, according to which the flow and/or fluid pressure in the at least one fluid line correspond to a selectable state of the artificial patient.

A13. Method according to any one of the preceding aspects, wherein the simulation data recorded are used for evaluating the qualification of a test subject.

A14. Method according to any one of the preceding aspects, wherein recorded simulation data are used for evaluating the operability of the technical medical device.

A15. Method according to any one of the preceding aspects, wherein the technical medical device is a blood treatment machine and is equipped in particular for dialysis.

A16. Method according to any one of the preceding aspects, wherein the termination criterion is the occurrence of a harmful situation.

A17. Method according to any one of the preceding aspects, wherein the initiation of the change in state of the simulation environment is characteristic of a certain medical situation.

B1. System comprising:
- a technical medical device as part of a simulation environment whose operating parameters can be controlled and observed;
- at least one device for recording the simulation data, at least for the duration of the simulation;
- at least one personal sensor which is equipped to detect data pertaining to a test subject who is in the simulation room that is part of the simulation environment, characterized by
at least one control devices which is connected by a technical data link to the technical medical device and the at least one personal sensor, wherein the at least one control devices is equipped to initiate a change in state of the simulation environment.

B2. System according to aspect B1, comprising:
an artificial patient as part of the simulation environment wherein the artificial patient can interact with the technical medical device for the purpose of executing a simulated treatment and whose operating parameters can be controlled and observed and which can be connected to the at least one control devices by a technical data link.

B3. System according to any one of the preceding aspects B1-B2, wherein the at least one personal sensor is equipped to detect parameters that may be selected from the following group:
- physiological data of a test subject;
- focusing points of a test subject;
- audio and/or video recordings of a test subject;
- input of a test subject into an operator interface.

B4. System according to any one of aspects B1-B3, wherein the simulation data comprise the operating parameters of the technical medical device and/or the operating parameters of the artificial patient.

B5. System according to any one of aspects B1-B4, wherein the at least one control devices is configured so that it carries out the following steps in initiation of a change in state of the simulation environment:
controlling the technical medical device and/or devices interacting with the technical medical device by means of the technical data link in such a way that the technical medical device and/or the devices interacting with the technical medical device convert its instantaneous operating state into another operating state.

B6. System according to aspect B2, wherein the at least one control devices is configured so that it carries out the following steps in an initiation of a change in state of the simulation environment:

controlling the artificial patient via the technical data link in such a way that the artificial patient converts its instantaneous operating state into another operating state.

B7. System according to any one of aspects B1-B6, wherein the at least one control devices is connected by a technical data link to equipment for adjusting environmental variables of the simulation environment that are adjustable by the control devices in this way, and the at least one control devices is configured so that it carries out the following step on initiation of a change in state of the simulation environment:

controlling and adjusting the devices for adjusting environmental variables, wherein the environmental variables of the simulation room may be selected from a group comprising:
  room temperature;
  illumination intensity;
  noise level;
  ventilation;
  atmospheric humidity.

B8. System according to any one of aspects B2 to B8, wherein the artificial patient has a human shape and is equipped with at least one of the following devices:
  artificial eyes that can be controlled in such a way that their visual appearance can be altered;
  a loudspeaker;
  at least one actuator that is equipped for moving at least one part of the artificial patient;
  at least one actuator that is arranged and configured in the artificial patient in such a way that a perceptible pulse is generated by controlling the actuator.

B9. System according to any one of aspects B2 to B8, wherein the artificial patient is equipped with a fluid system having at least one fluid line which can be connected to an external fluid system and wherein the fluid system of the artificial patient is designed so that the flow and the fluid pressure in the at least one fluid line can be influenced independently of one another.

B10. System according to any one of aspects B2 to B9, wherein the interaction of the artificial patient with the technical medical device comprises a simulated treatment embodiment, embodiment, wherein means are equipped for fluid transport of at least one fluid between the technical medical device and the artificial patient.

B11. System according to aspect B10, comprising a device for controllable suppression or prevention of the fluid transport.

B12. System according to aspect B5 or B6, comprising a computer with an operator interface that is configured and programmed to display a variety of selectable causes for a certain medical situation which corresponds to the instantaneous operating system of the technical medical device or the instantaneous operating system of the devices interacting with the technical medical device or corresponding to the instantaneous operating state of the artificial patient or to |display|$_{[BS1]}$ on the operator interface and to receive an input of the test subject which corresponds to a selected and displayed cause of this medical situation and to process it in terms of the data technology.

B13. System according to any one of aspects B1-B12, wherein the technical medical device is a blood treatment device and is equipped in particular for dialysis.

B14. Software program or software program product for operating the system according to aspect B12, with program instructions that can be read and executed by computer and are stored in data memory, programming the computer to display a variety of selectable causes of the medical situation specified on an operator interface and receiving and processing by data technology an input by the test subject corresponding to a selected and displayed state.

B15. Software program or software program product for operating the system according to any one of the aspects B1-B13, having program instructions that are stored on a data medium and can be read and executed by at least one control devices such that, when they are executed by the at least one control devices they program the at least one control devices to initiate the change in state of the simulation environment and/or to process the simulation data thereby recorded and/or to process the data detected by the at least one personal sensor.

C1. Technical medical device comprising at least one devices for controllably inducing an abnormal operating state of the technical medical device.

C2. Technical medical device according to aspect C1, wherein the at least one devices for controllably inducing an abnormal operating state comprises: at least one first control devices, at least one actuator and at least one sensor and a data interface equipped for data exchange with a second control devices,
  characterized in that
  the technical medical device is equipped to make the at least one actuator and the least one sensor controllable and controllable by the second control devices in an operating mode.

C3. Technical medical device according to any one of the aspects C1-C2, wherein the technical medical device is a blood treatment device and in particular is equipped for dialysis.

C4. Technical medical device according to aspect C3, which can be equipped with disposable items for designing an extracorporeal blood circulation, according to which the at least one devices for controllably inducing an abnormal operating state may be selected from the following group:
  means for introducing air into the extracorporeal blood circulation;
  means for interrupting the extracorporeal circulation;
  means for separating fluid outside of the extracorporeal blood circulation;
  means for interrupting the power supply to the blood treatment device.

C5. Technical medical device according to aspect C4, wherein the means for introducing air into the extracorporeal blood circulation is a pump.

C6. Technical medical device according to aspect C4, wherein the means for interrupting the extracorporeal blood circulation is an electromechanical, pneumatic or hydraulic clamp.

C7. Technical medical device according to aspect C4, wherein the means for separating fluid outside of the extracorporeal blood circulation comprises a pump or is a valve which diverts fluid from the extracorporeal blood circulation.

C8. Technical medical device according to any one of the aspects C1-C7, comprising an artificial patient which interacts with the technical medical device as part of implementation of a treatment.

C9. Technical medical device according to aspect C4, comprising disposable articles furnished for forming an extracorporeal blood circulation.

C10. Technical medical device according to aspect C9, wherein the extracorporeal blood circulation is filled with a blood replacement fluid.

C11. Technical medical device according to any one of the aspects C9 or C10, comprising an artificial patient, wherein the artificial patient is equipped with a fluid system having at least one fluid line and connected to the extracorporeal blood circulation.

C12. Technical medical device according to any one of the aspects C1-C11, comprising at least one operator interface, wherein the technical medical device is configured and programmed to display a plurality of selectable causes for the abnormal operating state to be induced on the operator interface and comprising a user input, which corresponds to selection of one of the causes displayed, and to receive said selections and to process them via a technical data link.

C13. Technical medical device according to aspect C12, comprising a camera, a microphone and a loudspeaker, wherein the technical medical device is equipped to establish an audiovisual communication with a remote device.

C14. Software program or software program product, for operation of the technical medical device according to any one of the aspects C12 or C13, with program instructions stored on a data medium and readable and executable by the at least one control devices such that when they are executed by at least one control devices they program at least one control devices to display a plurality of selectable causes for the abnormal operating state induced on the operator interface and comprising a user input, which corresponds to the selection of one of the causes displayed, and to receive said selections and to process them by a technical data link.

C15. Use of a technical medical device according to any one of the aspects C1-C14 for executing a method for simulation of medical treatments.

D1. Fluid system for accommodating a medical fluid, comprising: a first fluid line and a second fluid line, wherein the first fluid line and the second fluid line and at least external fluid line can be connected, characterized in that the fluid system has actuators with which the respective flow and the respective fluid pressure can be adjusted independently of one another in the first fluid line and in the second fluid line.

D2. Fluid system according to aspect D1, comprising a fluid reservoir having an inlet and an outlet, wherein the inlet and the outlet can be connected to one another by a first valve, and in which a fluid pump is arranged in the first fluid circulation found by the connection between the inlet and outlet, said fluid pump being set up for circulating the fluid in the first fluid circulation and wherein a fluid connection to the first fluid line exists upstream from the first valve and a fluid connection to the second fluid line exists downstream from the first valve.

D3. Fluid system according to any one of the aspects D1-D2, wherein the first and the second fluid lines can be connected to one another by a second valve.

D4. Fluid system according to any one of the aspects D1-D3, wherein a first 3-way valve is arranged in the first fluid line, said valve in a first operating mode connecting the partial piece of the first fluid line situated upstream from the first 3-way valve to the partial piece of the first fluid line situated downstream from the first 3-way valve and in a second operating mode connecting the partial piece situated downstream from the first 3-way valve//of the first fluid line to ambient air.

D5. Fluid system according to any one of the aspects D1-D4, wherein the fluid reservoir has an overflow which in normal operation is arranged above the fluid level in the fluid reservoir, and wherein a fluid line leads from the overflow to a second 3-way valve which is arranged in the second fluid line, wherein the second 3-way valve in a first operating mode connects the partial piece of the second fluid line situated upstream from the second 3-way valve to the partial piece of the second fluid line situated downstream from the second 3-way valve and in a second operating mode connects the partial piece of the second fluid line situated downstream from the second 3-way valve to the fluid line leading from the overflow to the second 3-way valve.

D6. Fluid system according to any one of the aspects D1-D5, wherein means for adjusting the flow are arranged in the first fluid line and in the second fluid line.

D7. Fluid system according to any one of the aspects D1 to D6, wherein means for adjusting the flow are arranged in the first fluid circulation.

D8. Fluid system according to any one of the aspects D1-D7, wherein in drip chamber is arranged in the first fluid circulation.

D9. Fluid system according to any one of the aspects D1-D8, wherein means are provided to influence the viscosity of the fluid in the fluid lines.

D10. Fluid system according to any one of the aspects D1-D9, wherein the first and second fluid lines run inside an artificial human arm.

D11. Fluid system according to aspect D10, wherein at least one puncture site is provided on the artificial human arm for connecting the first and/or second fluid lines to at least one external fluid line, and at least one optical signaling device is provided on this at least one puncture site.

D12. Fluid system according to any one of the aspects D10 or D11, wherein the artificial human arm is equipped with an actuator, which is configured, so that a perceptible pulse is generated by controlling the actuator.

D13. Fluid system according to any one of the aspects D1-D12, wherein the connection of the first fluid line and the second fluid line to the at least one external fluid line can be established through hollow needles which can be advanced through actuators in such a way that the respective hollow needle slips out of the first or second fluid line or the respective hollow needle is moved toward the internal bordering surface of the connected fluid line.

D14. Fluid system according to any one of the aspects D1-D13, wherein the actuators can be controlled and/or read out by a control devices and/or sensors are provided, said sensors being set up for determining the flow and/or fluid pressure in the fluid system and wherein the actuators and the sensors can be controlled and/or read out by a control devices.

D15. Fluid system according to aspect D1, additionally comprising a fluid reservoir with an inlet and an outlet, wherein the inlet and the outlet can be connected to one another by means of a first valve, and a fluid pump is arranged in the first fluid circulation formed by the connection between the inlet and the outlet, said fluid pump being set up for circulating the fluid in the first fluid circulation, and wherein there is a fluid connection to the first fluid line upstream from the first valve, and there is a fluid connection to the second fluid line downstream from the first valve.

D16. Fluid system according to D15, wherein the pump is a centrifugal pump.

D17. Fluid system according to aspect D9, wherein the fluid is a magneto-rheological and/or electro-rheological fluid and the means for influencing the viscosity of the fluid are set up to establish a magnetic or electrical field in the fluid.

D18. Fluid system according to aspect D9, wherein the means are set up for influencing the viscosity of the fluid in the fluid lines, to supply agents for influencing the viscosity of the fluid by adding them to the fluid.

D19. Fluid system according to aspect D18, wherein the agents added to the fluid may be selected from the following substances:
hydroxyethyl starch;
polyethylene glycol; glycol;
water.

|D19|$_{[PFW2]}$. Use of a fluid system according to any one of aspects D1-D14 for carrying out a method for simulating medical treatments.

E1. Devices for simulating at least one human property, wherein the simulation of the at least one human property can be controlled and/or controlled by a control devices,
characterized in that
the human property is the vascular system, wherein the simulation of the vascular system comprises; a fluid system for holding a medical fluid, having a first fluid line and a second fluid line, wherein the first fluid line and the second fluid line can each be connected to at least one external fluid line, and wherein the fluid system has actuators with which the respective flow and the respective fluid pressure in the first fluid line and in the second fluid line can be adjusted independently of the another,
and/or
the human property is the appearance of human eyes, wherein the simulation of the appearance of the human eyes comprises: artificial eyes which can be controlled in such a way that their optical appearance can be varied.

E2. Devices according to aspect E1, wherein at least one additional human property may be selected from the following group:
human vocal verbalizations;
physical movement;
human heart rate;
viscosity of the fluid in the vascular system;
temperature of the fluid in the vascular system;
respiration;
and wherein the simulation of the human vocal verbalizations comprises a loudspeaker by means of which human vocal verbalizations can be output,
and wherein the simulation of the physical movement comprises at least one actuator which is set up for moving at least one portion of the artificial patient,
and wherein the simulation of the human pulse comprises at least one actuator which is arranged and configured in the artificial patient in such a way that a perceptible pulse is generated by the controlling of the actuator,
and wherein the simulation of the viscosity of the fluid in the vascular system comprises means with which the viscosity of the fluid in the fluid system can be influenced,
and wherein the simulation of the temperature of the fluid in the vascular system comprises the fact that a heating/cooling devices is provided with which the temperature of the fluid in the fluid system can be influenced,
and wherein the simulation of respiration comprises the fact that the actuator which is equipped for moving at least a portion of the artificial patient is equipped for moving the chest of the artificial patient and is controlled in such a way that the movement thereby generated raises and lowers the chest periodically.

E3. Devices according to aspect E2, wherein the means with which the viscosity of the fluid can be influenced in the fluid system comprise:
the fact that the fluid in the fluid system is a magneto-rheological and/or electro-rheological fluid and means are provided which are equipped to build up a magnetic or electrical field in the fluid,
or that means are provided, which are equipped to supply substances which influence the viscosity of the fluid to the fluid it.

E4. Devices according to any one of aspects E1-E3, wherein the devices is in the form of a human body and wherein at least the first and the second fluid lines run inside an artificial human arm of the devices.

E5. Devices according to aspect E4, wherein the shape of the human body may have different characteristics, wherein the characteristics may pertain to the following features;
age;
gender;
weight;
race;
height.

E6. Devices according to any one of aspects E1-E5, wherein for connecting the first and/or second fluid lines to at least one external fluid line, at least one puncture site is provided and at least one optical signaling devices is provided at this at least one puncture site.

E7. Devices according to any one of aspects E1-E5, wherein the artificial eyes comprise monitors or the projection of an image of an eye.

E8. Devices according to aspect E1 wherein the artificial eyes are embodied as a device in eyeglass form, wherein controllable motors are mounted instead of glasses there, and wherein the monitors can be controlled in such a way that the representation of human eyes is displayed on them.

E9. Method for simulation of the state of a human property comprising the following steps:
use of a device according to any one of the aspects E1-E8;
control of the simulation of the human property such that the simulation corresponds to a selectable state of the human property.

E10. Method according to aspect E9, wherein the condition of the human property can be selected from:
pressure and flow rate of the fluid in the vascular system;
viscosity of the fluid in the vascular system;
temperature in the vascular system;
movement of at least one part of the human body.

E11. Method according to aspect E9, wherein the human property can be selected from the following properties:
mental condition;
age;
well-being;
and wherein the control of the artificial eyes and/or of the at least one actuator that is equipped for moving at least one portion of the artificial patient and/or of the loudspeaker takes place in such a way that the control corresponds to the selected human property.

E12. Use of a device according to any one of the aspects E1 to E8 in a system for simulation of a medical treatment.

E13. Method according to aspect E12, wherein the devices interacts with a technical medical device and the control of the simulation of the at least one human property takes place in such a way that the condition of at least one human property corresponds to a selectable medical situation.

E14. Method according to aspect E13, wherein the technical medical device is a blood treatment machine and in particular is equipped for dialysis.

E15. Software program or software program product, which is stored on a data medium, characterized in that when it is operated by the control devices according to any one of aspects E1 to E8, the control devices is programmed so that the processes are carried out according to any one of the aspects E9 to E14.

The invention claimed is:

1. A method for simulation of medical treatments comprising the steps of:
providing at least one technical medical device as part of a simulation environment whose operating parameters can be controlled and can be observed,
recording simulation data at least for the duration of the simulation, wherein the simulation data are physiological data on a test subject, focusing points of a test subject, audio and video recordings of a test subject, entries by a test subject into an operator interface, and operating parameters of the technical medical device,
initiating a change in state of the simulation environment, and
verifying a termination criterion.

2. The method according to claim 1, comprising the additional step of:
providing an artificial patient as part of the simulation environment, wherein the artificial patient can interact with the technical medical device for the purpose of carrying out a simulated treatment and operating parameters of the artificial patient can be controlled and observed.

3. The method according to claim 2, wherein the simulation data comprise operating parameters of the artificial patient.

4. The method according to claim 1, wherein the initiation of the change in state of the simulation environment comprises:
controlling the technical medical device and/or a device that interacts with the technical medical device, such that the technical medical device and/or the devices interacting with the technical medical device convert its instantaneous operating state into another operating state.

5. The method according to claim 2, wherein the initiation of the change in state of the simulation environment comprises:
controlling the artificial patient in such a way that the artificial patient converts its instantaneous operating state into another operating state.

6. The method according to claim 1, wherein the initiation of the change in state of the simulation environment comprises:
change in the environmental variables of the simulation room, wherein the environmental variables of the simulation room are selected from the group consisting of:
room temperature;
illumination intensity;
noises;
ventilation; and
atmospheric humidity.

7. The method according to claim 1, wherein the initiation of the change in state of the simulation environment is characteristic of a certain medical situation.

8. The method as recited in claim 2, wherein the artificial patient has a human shape and is equipped with at least one of the following devices:
artificial eyes that can be controlled in such a way that their optical appearance can be varied;
a loudspeaker;
at least one actuator equipped for moving at least one extremity of the artificial patient; and
at least one actuator arranged and configured in the artificial patient to generate a perceptible pulse.

9. The method according to claim 8, wherein:
the artificial eyes are controlled in such way that their appearance corresponds to a selectable physical state of the artificial patient;
the loudspeaker is controlled in such a way that human sounds are output through it, corresponding to a selectable physical state of the artificial patient;
the at least one actuator equipped for moving the at least one extremity of the artificial patient is controlled in such a way that there is a selectable movement of the artificial patient; and
the at least one actuator arranged and configured in the artificial patient to generate a perceptible pulse is controlled such that the pulse thus generated corresponds to a selectable physical state of the artificial patient.

10. The method as recited in claim 2, wherein the artificial patient is equipped with a fluid system having at least one fluid line which can be connected to an external fluid system and wherein the fluid system of the artificial patient is designed so that the flow rate and the fluid pressure in the at least one fluid line can be influenced independently of one another.

11. The method according to claim 10, wherein the flow rate and/or the fluid pressure in the at least one fluid line correspond to a selectable physical state of the artificial patient.

12. The method according to claim 1, wherein the simulation data recorded are used for evaluating the qualification of a test subject.

13. The method according to claim 1, wherein the data recorded are used for evaluating the operability of the technical medical device.

14. The method according to claim 1, wherein the technical medical device is a blood treatment machine and is equipped for dialysis in particular.

* * * * *

UNITED STATES PATENT AND TRADEMARK OFFICE
CERTIFICATE OF CORRECTION

PATENT NO. : 11,466,235 B2
APPLICATION NO. : 16/484862
DATED : October 11, 2022
INVENTOR(S) : Holger Bluemler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 412 days.

Item (22), PCT Filed: please change the PCT filing date "March 27, 2008" to --February 14, 2018--.

Item (86), PCT No.: please change the "PCT/EP2008/053637" to --PCT/EP2018/053637--.

Item (87), PCT Pub. No.: please change the PCT Pub. No. "WO2008/125451" to --WO2018/149585--; and Item (87), PCT Pub. Date: please change the PCT Pub. Date: "Oct. 23, 2008" to --Aug. 23, 2018--.

Item (30), Foreign Application Priority Date: please change the priority date and number: "Apr. 16 2007 (EP).........07106225" to --Feb. 15, 2017....17156330.7; Feb. 15, 2017....17156332.3; Feb. 15, 2017.....17156333.1; Feb. 15, 2017.....17156335.6; Feb. 15, 2017.....17156336.4--.

Signed and Sealed this
Third Day of January, 2023

Katherine Kelly Vidal
*Director of the United States Patent and Trademark Office*